United States Patent
Shalaby et al.

(10) Patent No.: US 12,368,474 B1
(45) Date of Patent: Jul. 22, 2025

(54) ADAPTIVE INNOVATIVE DUAL-POLARIZED MIMO EQUALIZER ANTENNA SYSTEM FOR CROSSTALK MITIGATION IN DUSTY ENVIRONMENTS

(71) Applicant: IMAM MOHAMMAD IBN SAUD ISLAMIC UNIVERSITY, Riyadh (SA)

(72) Inventors: Mohamed Yehia Mohamed Shalaby, Riyadh (SA); Yazeed M. Alkhirajh, Riyadh (SA); Mohamad A. Alawad, Riyadh (SA); Abdulrahman M. Shalaby, Kajang (MY)

(73) Assignee: IMAM MOHAMMAD IBN SAUD ISLAMIC UNIVERSITY, Riyadh (SA)

( * ) Notice: Subject to any disclaimer, the term of this patent is extended or adjusted under 35 U.S.C. 154(b) by 0 days.

(21) Appl. No.: 19/074,696

(22) Filed: Mar. 10, 2025

(51) Int. Cl.
*H04B 7/0413* (2017.01)
*H04B 7/08* (2006.01)
(Continued)

(52) U.S. Cl.
CPC ........... *H04B 7/0413* (2013.01); *H04B 7/082* (2013.01); *H04B 17/12* (2015.01); *H04B 17/221* (2023.05)

(58) Field of Classification Search
CPC ...... H04B 7/0413; H04B 1/082; H04B 17/12; H04B 17/221
See application file for complete search history.

(56) References Cited

U.S. PATENT DOCUMENTS

| | | | |
|---|---|---|---|
| 2017/0257124 A1* | 9/2017 | Gan | ..................... H04B 1/082 |
| 2021/0142447 A1 | 5/2021 | Groeneveld | |
| 2024/0259970 A1 | 8/2024 | Lee et al. | |

FOREIGN PATENT DOCUMENTS

CN 117675455 A 3/2024

OTHER PUBLICATIONS

Wang Miao, et al., "Unlocking the potential of 5G and beyond networks to support massive access of ground and air devices", IEEE Transactions on Network Science and Engineering, vol. 8, Issue 4, 2021, pp. 2825-2836 (17 pages).

(Continued)

*Primary Examiner* — Rahel Guarino
(74) *Attorney, Agent, or Firm* — Oblon, McClelland, Maier & Neustadt, L.L.P.

(57) ABSTRACT

A system, method, and apparatus for adaptive signal equalization in an unmanned aerial vehicle (UAV) operating in a dusty environment. The system comprises a first and a second multiple-input multiple-output (MIMO) antenna channel, each orthogonally polarized, for transmitting data over a carrier frequency from the UAV to a target device on the ground. The system includes a dust level sensor configured to measure dust concentration in real time and a signal equalizer device that compensates for dust-induced distortions. The signal equalizer device estimates the impact of dust on the communication link based on the measured dust level, UAV height, and elevation angle, and dynamically adjusts the transmitted signals to eliminate crosstalk between the MIMO antenna channels. The adaptive equalization ensures robust and interference-free communication, maintaining signal integrity despite environmental challenges posed by dust storms or airborne particles.

20 Claims, 23 Drawing Sheets

(51) Int. Cl.
*H04B 17/12* (2015.01)
*H04B 17/21* (2015.01)

(56) References Cited

OTHER PUBLICATIONS

Roberto Diego Martinez, et al., "Real time route adjustment of a UAV based on dust measurement with an onboard sensor", Archives of Advanced Engineering Science Jan. 15, 2024, pp. 1-9 (9 pages).

* cited by examiner

ADAPTIVE INNOVATIVE DUAL-POLARIZED MIMO EQUALIZER ANTENNA SYSTEM FOR CROSSTALK MITIGATION IN DUSTY ENVIRONMENTS

BACKGROUND

Technical Field

The present disclosure is directed to an adaptive signal equalizing apparatus and method for an unmanned aerial vehicle (UAV) operating in a dusty environment.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Wireless communication technologies, particularly include Multiple Input Multiple Output (MIMO) antenna systems, have gained significant attention in recent years due to their ability to enhance data transmission capacity and spectral efficiency. The rapid evolution of 5G and emerging 6G mobile networks has emphasized the importance of high-frequency MIMO systems, including dual-polarized antennas, to achieve improved signal reliability and data throughput. However, in challenging environmental conditions, such as those encountered in arid and disaster-prone regions, wireless signals suffer from performance degradation due to propagation losses and cross-polarization effects caused by atmospheric particulates, such as dust and sandstorms.

MIMO systems operate by utilizing multiple antennas at both the transmitter and receiver to improve spectral efficiency and reliability through spatial multiplexing and diversity techniques. Dual-polarized MIMO antennas further enhance these systems by transmitting orthogonally polarized signals, effectively doubling the channel capacity without requiring additional bandwidth. However, in environments where airborne dust particles are present, such as in countries like Saudi Arabia, the propagation medium becomes anisotropic, causing differential attenuation and phase shifts in orthogonally polarized signals. This results in crosstalk between polarization channels, leading to signal distortion and degradation in data transmission performance.

Existing research on the impact of atmospheric particulates on wireless communications has primarily focused on microwave and millimeter-wave signal propagation. Studies have demonstrated that dust particles can introduce polarization-dependent losses and phase variations, which severely affect MIMO system performance at high frequencies. For instance, Ghobrial and Sharief [See: S. Ghobrial and S. Sharief, "*Microwave Attenuation and Cross Polarization in Dust Storms*," IEEE Transactions on Antennas and Propagation, vol. 35, pp. 418-425, 1987, doi: 10.1109/TAP.1987.1144120] conducted early experiments with microwave attenuation and cross-polarization effects induced by dust storms. The work provided foundational insights into how dust alters signal propagation characteristics by introducing anisotropic losses. The effect of dust on cross-polarization has been widely studied, particularly in relation to its impact on millimeter-wave communication. Research conducted by Musa et al. [See: A. Musa, S. O. Bashir, M. R. Islam, and O. O. Khalifa, "*Dust-storm induced cross-polarization at MMW bands in Northern Nigeria*," in 2012 International Conference on Computer and Communication Engineering (ICCCE), 2012, doi: 10.1109/IC-CCE.2012.6271354] examined dust-storm-induced cross-polarization in Northern Nigeria at millimeter-wave frequencies, demonstrating that dust particles can cause significant interference between orthogonally polarized signals in dual-polarized MIMO systems. Expanding on this study, Musa and Paul [See: A. Musa and B. S. Paul, "*Prediction of dust particle-induced cross polarization at microwave and millimeter wave bands*," Progress In Electromagnetics Research M, vol. 70, 2018, doi: 10.2528/PIERM18053104] introduced a predictive model for dust-induced cross-polarization at microwave and millimeter-wave frequencies, providing critical insights into the depolarization mechanisms caused by dust particles. These findings are particularly relevant for designing UAV-based communication systems intended for operation in dusty environments. Additionally, the shape of dust particles has been identified as a contributing factor to electromagnetic wave propagation effects. Musa and Paul [See: Musa and B. S. Paul, "*Microwave attenuation and phase rotation by ellipsoidal dust particles*," Progress in Electromagnetics Research Letters, vol. 80, 2018, doi: 10.2528/PIERL18091703] investigated the attenuation and phase rotation caused by ellipsoidal dust particles, emphasizing the necessity of considering particle shape when modeling dust-induced signal distortions in communication systems.

In the context of MIMO systems, polarization diversity has been explored as a technique to improve performance. Ben Zid et al. [See: M. Ben Zid, K. Raoof, and A. Bouallegue, "*Dual polarized versus single polarized MIMO: A study over NLOS propagation with polarization discrimination and spatial correlation effects*", 2012 6th European Conference on Antennas and Propagation (EUCAP), Prague, Czech Republic, 2012, pp. 1979-1983] compared dual-polarized and single-polarized MIMO systems in non-line-of-sight (NLOS) propagation scenarios, considering polarization discrimination and spatial correlation effects. Their study provides valuable findings into the potential advantages of dual-polarized MIMO systems, which could be particularly relevant for UAV communications in dusty environments. Prayongpun and Raoof [See: N. Prayongpun and K. Raoof, "*Impact of depolarization phenomena on polarized MIMO channel performances*," International Journal of Communications, Network and System Sciences, vol. 1, 2008, doi: 10.4236/ijcns.2008.12016] further investigated the impact of depolarization phenomena on polarized MIMO channel performances. The work emphasizes the need to consider depolarization effects when designing and optimizing MIMO systems for challenging environments, such as those encountered by UAVs in dust storms.

The application of MIMO technology in millimeter-wave bands for vehicular communications, as discussed by Cheng et al. [See: X. Cheng, S. Gao, and L. Yang, "mm Wave Massive MIMO Vehicular Communications", Springer, 2022], offers potential results for UAV communications. While their focus is on vehicular systems, many of the challenges and solutions they discuss may be applicable to UAV communications in dusty conditions. Zhong and Xie [See: H. Zhong and L. Xie, "*Depolarization of microwave by sand-dust particles in atmospheric turbulence*," Journal of Quantitative Spectroscopy and Radiative Transfer, vol. 266, 2021, doi: 10.1016/j.jqsrt.2021.107603] explored the depolarization of microwaves by sand-dust particles in atmospheric turbulence. The research provides a more comprehensive understanding of how atmospheric conditions, combined with dust particles, can affect signal polarization. This work is particularly relevant for UAV communications, as these vehicles often operate in varying atmospheric conditions. To address the challenges posed by dust and sandstorms, novel antenna designs for millimeter-wave applications in 5G and MIMO systems have been proposed by Kishen and Wani [See: S. Kishen and K. Z. Wani, "Novel Millimetre Wave Antennas for MIMO and 5G Applications," Springer, 2021]. These advancements in antenna technology could potentially be adapted for use in UAV communication systems to mitigate the effects of dust-induced depolarization and attenuation.

Existing approaches to mitigating dust-induced crosstalk in MIMO communication systems remain inadequate. Traditional polarization diversity techniques attempt to mitigate crosstalk by optimizing antenna orientation and employing signal processing algorithms to correct for phase distortions. However, these methods do not dynamically compensate for real-time variations in dust concentration and environmental conditions. Moreover, current antenna designs lack adaptive mechanisms to counteract dust-induced signal degradation, limiting their effectiveness in high-frequency communication systems operating in arid and disaster-stricken regions.

Furthermore, UAV-based communication systems, which rely on MIMO technology for long-range and high-data-rate transmission, are particularly susceptible to dust-induced cross-polarization effects. In emergency scenarios, where UAVs serve as communication relays for disaster response and search-and-rescue operations, the reliability of MIMO links is critical. However, existing UAV communication frameworks do not incorporate real-time adaptive equalization techniques to mitigate dust-induced crosstalk, leading to compromised performance in environments with high airborne particulate densities.

Existing solutions also fail to address the specific challenges associated with high-frequency signal degradation in 5G and 6G networks. These networks operate at millimeter-wave frequencies, where dust-induced losses and phase distortions are more pronounced due to shorter wavelengths. Standard equalization techniques used in conventional wireless communication systems are not optimized for dynamically adjusting transmission parameters based on environmental conditions, leading to suboptimal performance in dusty environments.

Accordingly, it is one object of the present disclosure to provide methods and systems for mitigating dust-induced crosstalk in dual-polarized MIMO communication systems. The disclosure introduces an adaptive equalization mechanism that dynamically compensates for dust-induced phase shifts and polarization losses using real-time environmental data. By integrating dust sensors with an equalizer circuit, the system pre-distorts MIMO signals before transmission to counteract cross-polarization interference, thereby maintaining signal integrity and improving communication reliability in arid and disaster-prone environments. This novel approach addresses the limitations of existing technologies and enhances the performance of high-frequency MIMO systems, particularly in 5G, 6G, and UAV-based communication applications.

SUMMARY

In an exemplary embodiment, an adaptive signal equalizing apparatus for an unmanned aerial vehicle (UAV) operating in a dusty environment is described. The UAV includes a first multiple-input multiple-output (MIMO) antenna channel and a second MIMO antenna channel that are orthogonally polarized, the first and second MIMO antenna channels being configured to transmit data over a carrier frequency from the UAV in sky to a target device on ground. The apparatus includes a dust level sensor and a signal equalizer device. The dust level sensor is configured to measure a dust level in the dusty environment. The signal equalizer device is configured to, base on the measured dust level, the carrier frequency, a height of the UAV, and an elevation angle from the UAV to the target device, estimate a dust-induced change in a communication link from the UAV to the target device, and based on the estimated dust-induced change, adjust signals fed into the first and second MIMO antenna channels, such that crosstalk induced by the dusty environment between the first and second MIMO antenna channels is eliminated.

In another exemplary embodiment, an adaptive signal equalizing method for an unmanned aerial vehicle (UAV) operating in a dusty environment is described. The UAV having a first multiple-input multiple-output (MIMO) antenna channel and a second MIMO antenna channel that are orthogonally polarized, the first and second MIMO antenna channels being configured to transmit data over a carrier frequency from the UAV in sky to a target device on ground. The method includes measuring a dust level, via a dust level sensor, in the dusty environment, and via a signal equalizer device, based on the measured dust level, the carrier frequency, a height of the UAV, and an elevation angle from the UAV to the target device, estimating a dust-induced change in a communication link from the UAV to the target device, and based on the estimated dust-induced change, adjusting signals fed into the first and second MIMO antenna channels, such that crosstalk induced by the dusty environment between the first and second MIMO antenna channels is eliminated.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1A:
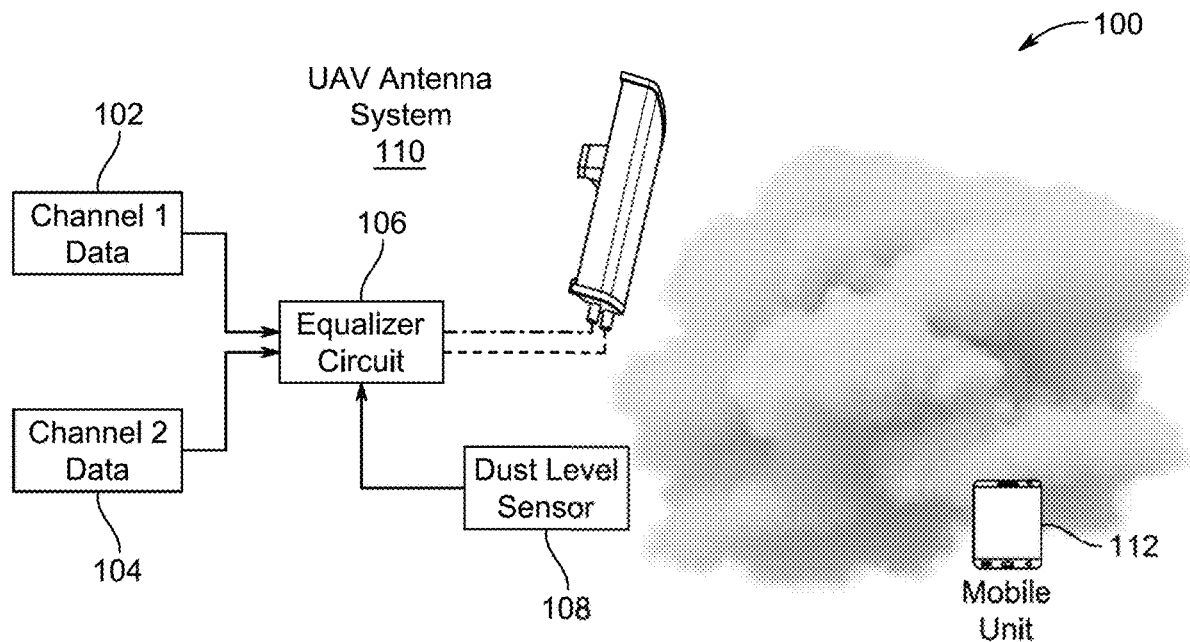
FIG. 1A illustrates a signal equalization system configured to mitigate crosstalk effects in a dual-polarized multiple-input multiple-output (MIMO) antenna system deployed in an unmanned aerial vehicle (UAV) operating in a dusty environment, in accordance with an exemplary aspect of the disclosure.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Aspects of this disclosure address dust-induced crosstalk in transmission at high frequencies. An adaptive signal equalizing apparatus for an unmanned aerial vehicle (UAV) operating in a dusty environment. The UAV has a first multiple-input multiple-output (MIMO) antenna channel and a second MIMO antenna channel that are orthogonally polarized. The first and second MIMO antenna channels are configured to transmit data over a carrier frequency from the UAV in sky to a target device on ground. The apparatus comprises a dust level sensor; and a signal equalizer device. The dust level sensor is configured to measure a dust level in the dusty environment. The signal equalizer device is configured to, based on the measured dust level, the carrier frequency, a height of the UAV, and an elevation angle from the UAV to the target device, estimate a dust-induced change in a communication link from the UAV to the target device, and based on the estimated dust-induced change, adjust signals fed into the first and second MIMO antenna channels, such that crosstalk induced by the dusty environment between the first and second MIMO antenna channels is eliminated.

FIG. 1A illustrates a signal equalization system 100 configured to mitigate crosstalk effects in a dual-polarized MIMO antenna system operating in a dusty environment. The system 100 incorporates an equalization mechanism that compensates for dust-induced signal degradation to render reliable wireless communication, particularly in arid and dust-prone regions, such as in countries like Saudi Arabia.

The system 100 includes a first data input 102 and a second data input 104, which correspond to two orthogonally polarized communication channels. The channels are configured to transmit signals over a carrier frequency from an unmanned aerial vehicle (UAV) to a target device (e.g., a mobile unit 112) on the ground. The first data input 102 carries a signal that is polarized in a first direction, while the second data input 104 carries a signal that is polarized in a second direction orthogonal to the first direction. The first data input 102 and the second data input 104 may correspond to various types of data, including but not limited to video transmission, real-time telemetry data, sensor readings, environmental monitoring data, or encrypted command and control signals. For example, in a UAV surveillance operation, the first data input 102 and the second data input 104 may carry high-resolution video footage, real-time position, and altitude telemetry information.

The equalization circuit 106 receives the signals from the first data input 102 and the second data input 104. The equalization circuit 106 is configured to perform a pre-compensation operation to counteract the crosstalk that is induced by dust particles present in the communication path. Crosstalk refers to an unwanted interference between the two polarized signals, resulting in signal degradation and loss of data integrity. The equalization circuit 106 estimates the signal distortion based on environmental factors and applies an initial signal correction before transmission. Specifically, the equalization circuit 106 adjusts the amplitude, phase, and polarization of the signals based on an estimated propagation distortion caused by dust, thereby improving the isolation between the two polarization channels. By performing this compensation before transmission, the system 100 ensures that the received signals at the target device retain their intended properties despite the adverse effects of the dusty environment.

The system 100 further includes a dust level sensor 108. The dust level sensor 108 is configured to measure the concentration of airborne dust particles at the operational altitude of the UAV. The measured dust level provides real-time environmental data, which is transmitted to the equalization circuit 106. Based on the dust concentration data, the equalization circuit 106 estimates the degree of signal degradation caused by the dusty environment. The equalization circuit 106 then applies an initial crosstalk between the first and second MIMO antenna channels such that the anticipated crosstalk effects induced by dust are effectively cancelled.

The equalized signals from the equalization circuit 106 are subsequently fed into a UAV antenna system 110. The UAV antenna system 110 is a MIMO antenna system mounted on the UAV and is configured to transmit the equalized signals toward a receiving unit of the target device. The UAV antenna system 110 is particularly configured to transmit the signals with the necessary pre-compensation, reducing the adverse effects of dust-induced depolarization.

MIMO refers to a multiple-input multiple-output communication technique that utilizes multiple antennas at both the transmitter and the receiver to improve spectral efficiency, increase data rates, and enhance signal reliability. Unlike traditional single-antenna systems, which transmit and receive signals using a single channel, MIMO systems is based on multiple spatially separated antennas to exploit multipath propagation. In a UAV-based MIMO communication system, the UAV carries multiple antennas to transmit data streams simultaneously over different channels. The receiving unit on the ground is also equipped with multiple antennas to decode the transmitted signals, thereby increasing the data throughput and maintaining robust communication, even in challenging environments, such as dusty atmospheres or urban settings with obstacles.

The transmitted signals propagate through the dusty environment and reach the mobile unit 112 located on the ground. The mobile unit 112 is equipped with a MIMO antenna system and is configured to receive the equalized signals. By applying the pre-compensation technique, the system 100 ensures that the signals received at the mobile unit 112 maintain their intended polarization characteristics despite the distortions introduced by the anisotropic dust medium.

UAVs of the system 100 include various types of drones and autonomous aircraft deployed in both civilian and military applications. In commercial applications, delivery drones may use the system 100 to ensure uninterrupted high-speed communication while navigating through urban environments or harsh desert conditions. Surveillance drones used in security and law enforcement may utilize the system 100 to transmit high-resolution real-time video feeds without degradation caused by dust storms or adverse weather. In military applications, reconnaissance UAVs equipped with the system 100 may maintain stable communication links while operating in battlefields or high-altitude regions where environmental factors impact signal propagation. Additionally, UAVs used for environmental monitoring, agricultural surveying, and search-and-rescue operations may utilize the system 100 to ensure reliable transmission of collected data, even in challenging conditions.

For instance, in a practical application, the system 100 may be deployed in a search and rescue operation in a desert region where dust storms frequently occur. In such an environment, conventional wireless communication systems may experience severe signal degradation due to the high density of dust particles in the atmosphere. By implementing the equalization circuit 106 and dust level sensor 108, the system 100 dynamically compensates for dust-induced crosstalk, allowing UAVs to maintain reliable communication links with ground units. This capability is essential for transmitting real-time video feeds, navigation data, and emergency alerts without signal degradation.

Another example of implementation involves industrial monitoring systems deployed in mining operations. In such an application, UAVs equipped with MIMO communication systems may be required to transmit sensor data from remote mining sites to control centres. The presence of dust and particulate matter in the air can significantly impact the quality of high-frequency wireless signals. By utilizing the equalization circuit 106, the system 100 ensures that data transmission remains robust, thereby facilitating continuous monitoring and analysis of mining operations.

Figure 1B:
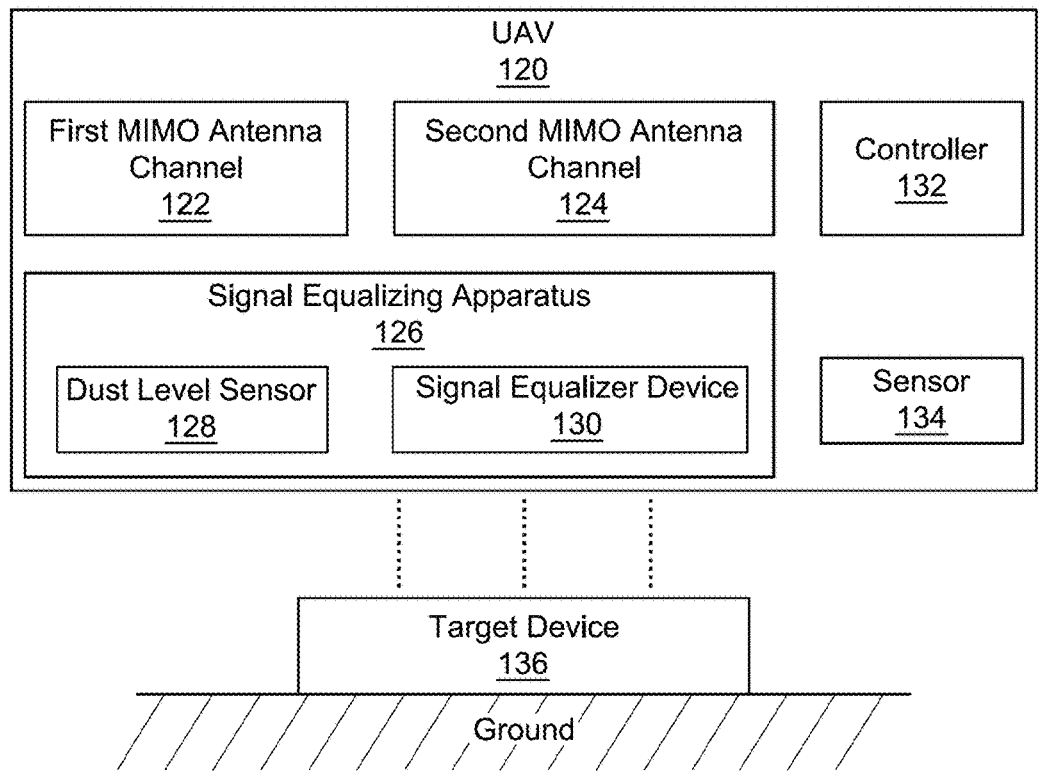
FIG. 1B illustrates the signal equalization system implemented on a UAV configured to mitigate crosstalk effects caused by dust in the propagation environment, in accordance with an exemplary aspect of the disclosure.

FIG. 1B illustrates the system 100 integrated into an UAV 120 configured to mitigate crosstalk effects caused by dust in the propagation environment. The system 100 consists of multiple components that work together to dynamically adjust transmitted signals and maintain reliable data exchange between the unmanned aerial vehicle and a ground-based target device.

The UAV 120 may be a rotary-wing drone, a fixed-wing aircraft, or a hybrid aerial vehicle designed for autonomous or remote-controlled operations. The UAV 120 is designed to operate in environments where airborne dust and particulate matter can interfere with wireless signal transmission. The system 100 includes, but may not be limited to, a first antenna channel MIMO and a second MIMO antenna channel 124, forming a multiple-input multiple-output antenna system. MIMO technology utilizes multiple antennas at both the transmitting and receiving ends to improve signal capacity, minimize interference, and enhance signal integrity in challenging environments. The first MIMO antenna channel 122 and the second MIMO antenna channel 124 are orthogonally polarized to allow independent data streams to be transmitted simultaneously. In the presence of airborne dust, the propagation medium becomes anisotropic, leading to differential attenuation and phase shifts in orthogonally polarized signals, which results in crosstalk between the channels, causing degradation in communication quality.

To mitigate the impact of dust on signal transmission, a signal equalizing apparatus 126 is implemented within the unmanned aerial vehicle. The signal equalizing apparatus 126 includes a dust level sensor and a signal equalizer device. The dust level sensor 128 is configured to detect the concentration of airborne dust particles at the altitude of the UAV 120. The dust level sensor 128 may rely on optical scattering, laser-based detection, or other particulate sensing methods to measure dust levels. The detected data is transmitted to a signal equalizer device 130, which processes this information to determine the extent of dust-induced distortions affecting the transmitted signals.

The signal equalizer device 130 is configured to receive real-time environmental data from the dust level sensor 128 and determines necessary adjustments for the transmitted signals. The signal equalizer device 130 estimates dust-induced changes, including attenuation levels and phase shifts, affecting both the vertically and horizontally polarized waves. Based on these estimations, the signal equalizer device 130 modifies the signals before transmission, compensating for polarization distortions and reducing crosstalk between the channels. Such process allows the UAV 102 to transmit data with improved reliability in dust-heavy environments.

A controller 132 is implemented within the UAV to manage various operational parameters and facilitate communication between the signal equalizing apparatus 126 and other onboard components. The controller 132 is configured to adjust transmission parameters, including carrier frequency and phase, based on real-time environmental conditions. In certain configurations, the controller 132 may regulate the altitude of the unmanned aerial vehicle or modify the transmission angle to optimize signal propagation under varying dust conditions.

A sensor 134 is positioned within the UAV 120 to provide additional environmental and positional data. The sensor 134 may be configured to measure the altitude, velocity, or orientation of the UAV 120. The acquired data is transmitted to the controller 132 and the signal equalizer device 130, allowing the system 100 to dynamically adapt signal processing based on variations in flight conditions.

A target device 136 is positioned on the ground and is configured to receive signals transmitted from the UAV 120. The target device 136 may be a stationary unit, a mobile communication system, or a ground-based relay equipped with the MIMO antenna system. The target device 136 is configured to process the received signals and extract the transmitted data.

The signal equalizing apparatus 126 is configured to estimate the level of crosstalk induced by the presence of dust particles between the first MIMO antenna channel 122 and the second MIMO antenna channel 124. Based on this estimation, the signal equalizer device 130 applies an initial crosstalk between the antenna channels, counteracting the interference introduced by dust. Such process maintains the separation between the polarization channels and preserves the integrity of the transmitted data streams.

The signal equalizer device 130 is configured to acquire a first signal ($\vec{E}_+$) to be transmitted from the first MIMO antenna channel 122 and a second signal ($\vec{E}_-$) to be transmitted from the second MIMO antenna channel 124. The signal equalizer device 130 projects the first and second signals ($\vec{E}_+$; $\vec{E}_-$) onto a vertical plane and a horizontal plane, thereby generating a pair of vertical plane components ($\vec{E}_{1+}$; $\vec{E}_{1-}$) in the vertical plane and a pair of horizontal plane components ($\vec{E}_{2+}$; $\vec{E}_{2-}$) in the horizontal plane. The vertical plane is oriented perpendicularly to both a first plane and the ground surface, while the horizontal plane is parallel to the ground surface and perpendicular to the first plane. The first plane contains the line-of-sight from the UAV 120 to the target device 136 and is perpendicular to the ground surface.

The signal equalizer device 130 is further configured to adjust the pair of vertical plane components ($\vec{E}_{1+}$; $\vec{E}_{1-}$) based on the estimated dust-induced change, generating an adjusted pair of vertical plane components ($\vec{E}_{+eq}$; $\vec{E}_{-eq}$). The signal equalizer device 130 then combines the adjusted pair of vertical plane components ($\vec{E}_{+eq}$; $\vec{E}_{-eq}$) with the horizontal plane components ($\vec{E}_{2+}$; $\vec{E}_{2-}$), resulting in an equalized first signal and an equalized second signal, which are subsequently fed into the first and second MIMO antenna channels (122, 124), respectively.

To estimate the dust-induced change, the signal equalizer device 130 determines the attenuation level and phase shift caused by the dusty environment on both vertically and horizontally polarized waves propagating from the UAV 120 to the target device 136. This estimation accounts for the variations in dust density and environmental conditions affecting the transmission path.

The elevation angle from the UAV 120 to the target device 136 can be either predefined and fixed or dynamically adjusted by the controller 132 within the UAV 120. In some embodiments, the signal equalizer device 130 acquires the elevation angle from the controller 132 to ensure real-time optimization of signal transmission.

The height of the UAV 120 is obtained from the sensor 134 equipped at the UAV 120, which measures the altitude above the ground. The signal equalizer device 130 continuously adjusts the transmitted signals based on environmental factors, including UAV altitude, carrier frequency, and elevation angle.

The system 100 supports both continuous transmission and packet-based transmission modes. In continuous transmission mode, the signal equalizer device 130 performs real-time adjustments to signals to compensate for environmental changes dynamically. In packet-based transmission mode, the signal equalizer device 130 adjusts the signals immediately before each packet is transmitted, ensuring optimal compensation for dust-induced effects.

The dust level sensor 128 measures the concentration of dust particles at the UAV's altitude, and the signal equalizer device 130 processes the measured dust level to compensate for signal degradation. By utilizing real-time environmental data, the system 100 ensures that the communication link between the UAV 120 and the target device 136 remains stable and reliable despite challenging conditions.

Figure 2:
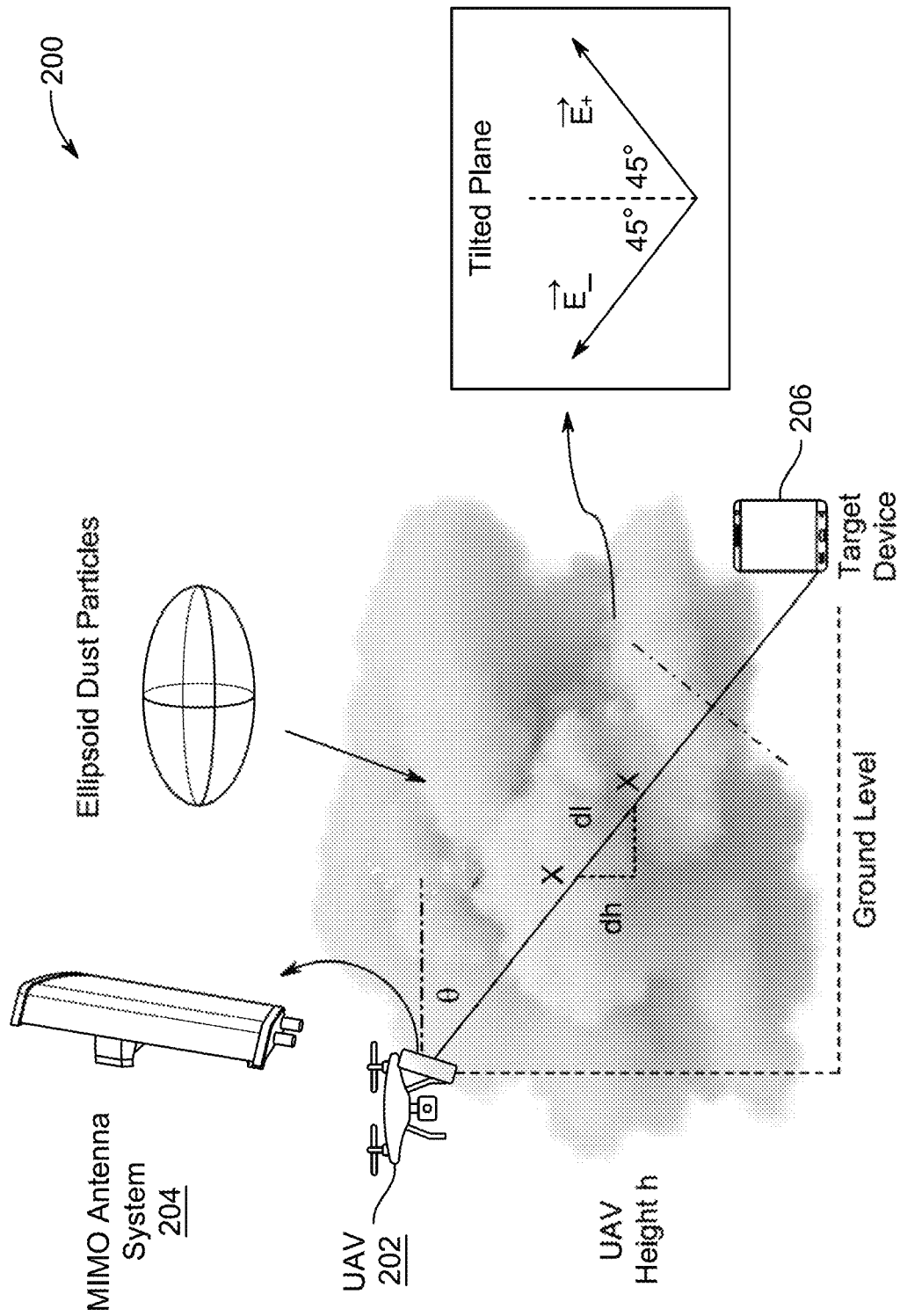
FIG. 2 illustrates main parameters required in the analysis of a link between the UAV and a target device at the ground, including loss and phase functions, in accordance with an exemplary aspect of the disclosure.

FIG. 2 shows the main parameters required in the analysis of the link between a UAV 202 and a target device 206 of a system 200 to calculate the loss and phase functions experienced by the wave propagating in vertical and horizontal polarizations.

In the system 200, an MIMO antenna system 204 is mounted on the UAV 202. The UAV 202, which a representation of the UAV 120 of FIG. 1B, operates in an environment with airborne dust particles that influence the propagation characteristics of transmitted signals. FIG. 2 illustrates transmission parameters that impact the effectiveness of the communication link between the UAV 202 and the ground-based target device 206.

The UAV 202 is positioned at a defined height above the ground level, where it transmits and receives data using dual-polarized signals. The MIMO antenna system 204 enables this communication by generating orthogonally polarized waves, represented as E+ and E−, which serve as independent channels for data transmission. The angle θ represents an elevation angle of the UAV 202 relative to the target device 206, which affects the propagation of the transmitted signals through the surrounding environment.

Airborne dust particles, shown as ellipsoidal structures in the diagram, form an anisotropic propagation medium. As the transmitted signals pass through this medium, the signals experience polarization-dependent attenuation and phase shifts. The tilted plane representation illustrates the manner in which the polarization components of the transmitted signals are altered due to the dust-induced propagation effects. The tilted plane is the plane perpendicular to the line of sight connecting the MIMO antenna system 204 on the UAV 202 to the target device 206 on the ground. The tilted plane makes an angle θ with the vertical plane. It contains the two main orthogonal polarization vectors, E+, and E−, which are oriented at +45° and −45°, respectively, relative to the line lying in the plane of the page and perpendicular to the line of sight.

To address dust-induced distortions, the UAV 202 is equipped with a dust level sensor (not shown in the FIG. 2) that continuously measures the concentration of airborne dust particles. The sensor data is utilized to estimate the impact of dust on the transmitted signals. Based on this estimation, the system 200 applies an equalization process that introduces phase pre-distortion to compensate for anticipated signal degradation.

Analysis of the main parameter is represented in a mathematical form. Attenuation and phase shift of vertically and horizontally polarized waves propagating in dry dust are represented by:

$$\alpha_v = \frac{7.53 \times 10^{-4}}{(\lambda V^\gamma)} \text{dB/km} \tag{1}$$

$$\alpha_v = \frac{7.53 \times 10^{-4}}{(\lambda V^\gamma)} \text{dB/km} \tag{2}$$

$$\alpha_h = \frac{1.47 \times 10^{-3}}{(\lambda V^\gamma)} \text{dB/km} \tag{3}$$

$$\phi_h = \frac{0.33}{(\lambda V^\gamma)} \text{degrees/km} \tag{4}$$

where γ=1.07, V represents visibility in kilometers, and λ denotes the wavelength in meters. Visibility in these equations is inherently dependent on altitude. To accurately determine the total signal attenuation and phase variation caused by propagation through the dusty medium from a UAV to the ground, the height dependency of visibility must be incorporated into these equations.

First, visibility is expressed in terms of the concentration of dust particles suspended in the air as:

$$V=(C/M)^{1/\gamma} \tag{5}$$

where C=2.3 10⁻⁵, and M is the dust concentration in kilogram per cubic meter of air, which depends on height as;

$$M=M'e^{-\alpha h} \tag{6}$$

Equation (6) relates M, which is the dust concentration in kilogram per cubic meter of air at height h in kilometer, to M', which is the dust concentration in kilogram per cubic meter of air at the ground level, where α=1.5 for very dense storm and 1.2 for light storm.

From Equation (6), if the dust sensor measures the dust concentration at the height of the UAV, dust concentration at the ground level is deduced as:

$$M'=M_{UAV}e^{\alpha h_{UAV}}$$

By substituting from equation (6) in equation (5), $$V = \left(\frac{c}{M'e^{-\alpha h}}\right)^{1/\gamma} = \left(\frac{c}{M'}\right)^{1/\gamma} e^{\alpha h/\gamma} = V'e^{\alpha h/\gamma} \tag{7}$$

where $$V' = \left(\frac{c}{M'}\right)^{1/\gamma}$$

is the visibility at the ground level.

Hence, the total attenuation from the UAV to the target device at the ground level for vertical polarization will be:

$$\text{Loss}_v \text{ (dB)}=\int \alpha_v dl \tag{8}$$

where dl is the incremental distance along the path from the UAV to the target device, which can be related to the elevation angle θ as:

$$dl = \frac{dh}{\sin\theta} \tag{9}$$

Then, the attenuation of the vertical component after substituting V from equation (7) will be:

$$\text{Loss}_v(\text{dB}) = \int \frac{7.53 \times 10^{-4}}{(\lambda V^{\prime\gamma} e^{\alpha h})} \frac{dh}{\sin\theta} = \frac{7.53 \times 10^{-4}}{(\lambda V^{\prime\gamma})} \frac{1}{\sin\theta} \int e^{-\alpha h} dh =$$

$$\frac{7.53 \times 10^{-4}}{(\lambda V^{\prime\gamma})} \frac{1}{\sin\theta} \left| \frac{e^{-\alpha h}}{-\alpha} \right|_0^{h_{UAV}} = \frac{7.53 \times 10^{-4}}{(\lambda V^{\prime\gamma})} \frac{1}{\sin\theta} \left(1 - e^{-\alpha h_{UAV}}\right)$$

In terms of dust concentration $M_{UAV}$, and visibility $V_{UAV}$, at the level of the UAV, this loss takes the form as follows:

$$\text{Loss}_v(\text{dB}) = \tag{10}$$

$$\frac{7.53 \times 10^{-4}}{(\lambda V_{UAV}^{\gamma})} \frac{1}{\sin\theta} \left(e^{\alpha h_{UAV}} - 1\right) = \frac{7.53 \times 10^{-4}}{\lambda C} \frac{M_{UAV}}{\sin\theta} \left(e^{\alpha h_{UAV}} - 1\right)$$

Similarly, attenuation of horizontally polarized component, $\text{Loss}_h$, will be:

$$\text{Loss}_h(\text{dB}) = \tag{11}$$

$$\frac{1.47 \times 10^{-3}}{(\lambda V_{UAV}^{\gamma})} \frac{1}{\sin\theta} \left(e^{\alpha h_{UAV}} - 1\right) = \frac{1.47 \times 10^{-3}}{\lambda C} \frac{M_{UAV}}{\sin\theta} \left(e^{\alpha h_{UAV}} - 1\right)$$

The total phase shift of a vertically polarized wave propagating from the UAV to the target device at the ground level is:

$$\Phi_v(\text{degrees}) = \int \frac{0.24}{(\lambda V^{\prime\gamma})} dl = \tag{12}$$

$$\int \frac{0.24}{(\lambda V^{\prime\gamma} e^{\alpha h})} \frac{dh}{\sin\theta} = \frac{0.24}{(\lambda V^{\prime\gamma})} \frac{1}{\sin\theta} \int e^{-\alpha h} dh = \frac{0.24}{(\lambda V^{\prime\gamma})} \frac{1}{\sin\theta} \left(1 - e^{-\alpha h_{UAV}}\right)$$

$$\Phi_v(\text{degrees}) = \frac{0.24}{(\lambda V_{UAV}^{\gamma})} \frac{1}{\sin\theta} \left(e^{\alpha h_{UAV}} - 1\right) = \frac{0.24}{\lambda C} \frac{M_{UAV}}{\sin\theta} \left(e^{\alpha h_{UAV}} - 1\right)$$

Similarly, the total phase shift of a horizontally polarized wave propagating from the UAV to the target device at the ground level is:

$$\Phi_h(\text{degrees}) = \frac{0.33}{(\lambda V_{UAV}^{\gamma})} \frac{1}{\sin\theta} \left(e^{\alpha h_{UAV}} - 1\right) = \frac{0.33}{\lambda C} \frac{M_{UAV}}{\sin\theta} \left(e^{\alpha h_{UAV}} - 1\right) \tag{13}$$

Equations (10)-(13) define the total attenuation and phase shift experienced by a wave as it propagates from a UAV to the target device located at the ground level. These equations account for two different polarization conditions, providing insights into wave behavior under varying conditions. The total attenuation and phase shift are influenced by the dust concentration or visibility at the UAV altitude, which can impact electromagnetic wave propagation. To monitor these conditions, the dust-level sensor equipped at the UAV continuously measures the dust concentration. Additionally, an onboard sensor is configured to monitor the UAV altitude in real time, etc.

The visibility at ground level and the visibility at the UAV altitude are inherently correlated through the UAV height. By determining the visibility at either ground level or the UAV altitude, along with the UAV's height, the visibility at the other location can be accurately estimated.

A key parameter in the equations is the elevation angle, which may be addressed in two distinct approaches based on the operational scenario. In certain applications, the elevation angle remains constant and predefined. This simplifies system operation by eliminating the need for dynamic measurements, as the elevation angle is known. In alternative implementations, the elevation angle is dynamically modified to optimize communication with multiple mobile receivers. In this configuration, the UAV employs a MIMO inclination control mechanism, wherein the antenna orientation is continuously adjusted based on precise elevation angle data. This dynamic adjustment ensures optimal signal quality while minimizing propagation losses for targeted receivers.

By integrating these sensors and control mechanisms, the UAV achieves enhanced adaptability to environmental and operational variations, ensuring stable and reliable communication with ground-based mobile units. This integrated approach facilitates accurate modeling of wave propagation characteristics under dynamic visibility and elevation conditions.

Figure 3A:
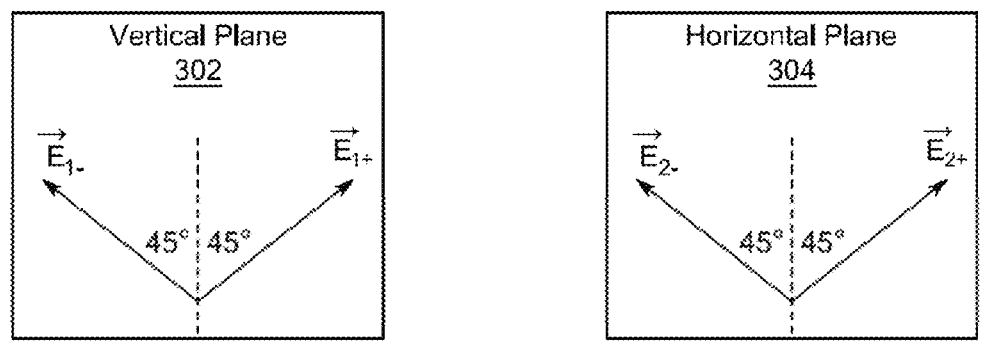
FIG. 3A illustrates the decomposition from orthogonally polarized waves in a tilted plane to a vertical plane and a horizontal plane, in accordance with an exemplary aspect of the disclosure.
Figure 3B:
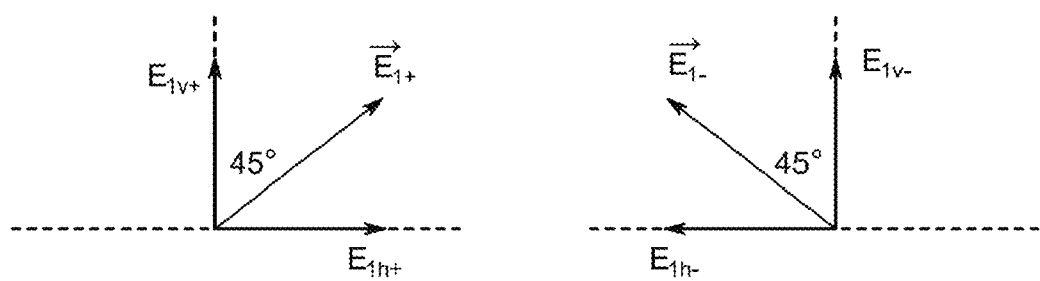
FIG. 3B illustrates the decomposition from vertical plane components to vertical and horizontal direction components, in accordance with an exemplary aspect of the disclosure.

FIG. 3A and FIG. 3B illustrate the decomposition of orthogonally polarized waves propagating through an anisotropic medium. As illustrated in FIGS. 3A and 3B, the orthogonally polarized waves in the tilted plane are first decomposed into vertical and horizontal planes, and the vertical plane components are then further decomposed into vertical and horizontal directions for subsequent equalization processing. When a communication system utilizing an MIMO antenna system is operating in an environment with airborne dust particles, the MIMO antenna system transmits orthogonally polarized electromagnetic waves, which experience polarization distortion and crosstalk due to anisotropic scattering effects in the dust-laden atmosphere. To counteract these distortions, the system performs an equalization process by first decomposing the polarized waves into their vertical and horizontal plane components.

FIG. 3A illustrates the vertical plane 302, which is perpendicular to both the plane of the page and the ground surface. The vertical plane contains two orthogonal polarization components, represented as $E_{1+}$ and $E_{1-}$, each oriented at an angle of +45° and −45° with respect to the reference direction. FIG. 3A further illustrates the horizontal plane 304, which is parallel to the ground surface and perpendicular to the plane of the page. Similar to the vertical plane, the horizontal plane contains the orthogonal polarization components $E_{2+}$ and $E_{2-}$, each oriented at +45° and −45° with respect to the reference direction.

As shown in FIG. 3B, the vertical plane components are further decomposed into vertical and horizontal directions. This decomposition plays a significant role in analyzing the phase variation and attenuation effects experienced by each polarization component, facilitating an analysis of the effects of cross-polarization and signal distortion in the vertical plane.

Cross-polarization discrimination (XPD) plays a critical role in determining the extent of crosstalk between the two polarization channels. The phase variation experienced by each polarization component is not uniform, resulting in an exchange of energy between the orthogonally polarized waves. This phenomenon leads to significant crosstalk, where the undesired signal from the cross-polarized channel can be as much as 100 times greater than the desired signal, corresponding to an XPD factor of 20 dB. Such a high level of XPD is particularly detrimental to communication systems operating in dusty environments, where suspended dust particles further exacerbate signal degradation. The implications of this effect are critical for high-frequency communication systems, such as those operating at 6G frequencies, especially in regions like Saudi Arabia or during emergency conditions with high dust concentrations. Understanding the influence of XPD in both vertical and horizontal planes is essential to designing robust MIMO communication systems capable of mitigating polarization-induced signal distortions.

As shown in FIG. 3A, in the initial stage, the orthogonally polarized waves propagating in the tilted plane are projected onto the vertical plane 302 and the horizontal plane 304. The projection enables a detailed analysis of how the polarized waves interact with the anisotropic dust medium.

Following the initial decomposition, the vertical plane components $E_{1+}$ and $E_{1-}$ are further decomposed into distinct vertical and horizontal direction components. The secondary decomposition process is represented in FIG. 3B, where the vertical direction components $E_{1v+}$ and $E_{1v-}$ are distinguished from the horizontal direction components $E_{1h+}$ and $E_{1h-}$. The decomposition angles are indicated as 45°, corresponding to the standard basis transformation used to isolate the effects of anisotropic scattering.

In other words, the main polarization components $\vec{E}_+$ and $\vec{E}_-$ are projected on the vertical and horizontal planes as shown in FIG. 3A, resulting in the following components:

$$E_{1+}=E_+\cos\theta,\ E_{1-}=E_-\cos\theta$$

$$E_{2+}=E_+\sin\theta,\ E_{2-}=E_-\sin\theta \quad (14)$$

where θ is the elevation angle from the UAV to the target device.

Electric field components in the vertical plane $E_{1+}$ and $E_{1-}$ are transmitted through elliptically shaped dust particles. To evaluate electric field components $E'_{1+}$ and $E'_{1-}$ after passing through dust, three steps are needed. The first step is to rotate axes clockwise 45°, then multiply by horizontal and vertical transmission coefficients $T_h$ and $T_v$ respectively, finally rotate axes by 45° counterclockwise. These steps are expressed by the following matrix equation:

$$\begin{bmatrix} E'_{1+} \\ E'_{1-} \end{bmatrix} \begin{bmatrix} \cos 45 & -\sin 45 \\ \sin 45 & \cos 45 \end{bmatrix} \begin{bmatrix} T_h & 0 \\ 0 & T_v \end{bmatrix} \begin{bmatrix} \cos 45 & \sin 45 \\ -\sin 45 & \cos 45 \end{bmatrix} \begin{bmatrix} E_{1+} \\ E_{1-} \end{bmatrix} \quad (15)$$

The horizontal and vertical transmission coefficients through dust particles are given by $$T_h = e^{-Loss_h/2} \times e^{-j\Phi_h}$$

$$T_v = e^{-Loss_v/2} \times e^{-j\Phi_v} \quad (16)$$

where $Loss_h$, $Loss_v$, $\Phi_h$, and $\Phi_v$ are given by equations (10)-(13). Electric field components in the horizontal plane, $E_{2+}$ and $E_{2-}$, are transmitted through elliptically shaped dust particles. To evaluate electric field components $E'_{2+}$ and $E'_{2-}$ after passing through dust, both field components are multiplied by $T_h$; hence these components have no effect on crosstalk between the MIMO channels.

Crosstalk between data transmitted on $E_+$ and that transmitted on $E_-$ arises because of electric field components contained in the vertical plane as shown by equation (15) which can be rewritten as, $$E'_{1+} = \frac{1}{2}[E_{1+}(T_h+T_v) + E_{1-}(T_h-T_v)]$$

$$E'_{1-} = \frac{1}{2}[E_{1+}(T_h-T_v) + E_{1-}(T_h+T_v)] \quad (17)$$

Therefore, Cross Polarization Discrimination (XPD), which is the ratio of the undesired signal passing from one polarization state to the desired signal in this polarization state, is (when $E_{1+}=E_{1-}$):

$$XPD = \frac{|T_h - T_v|}{|T_h + T_v|} \quad (18)$$

Figure 4:
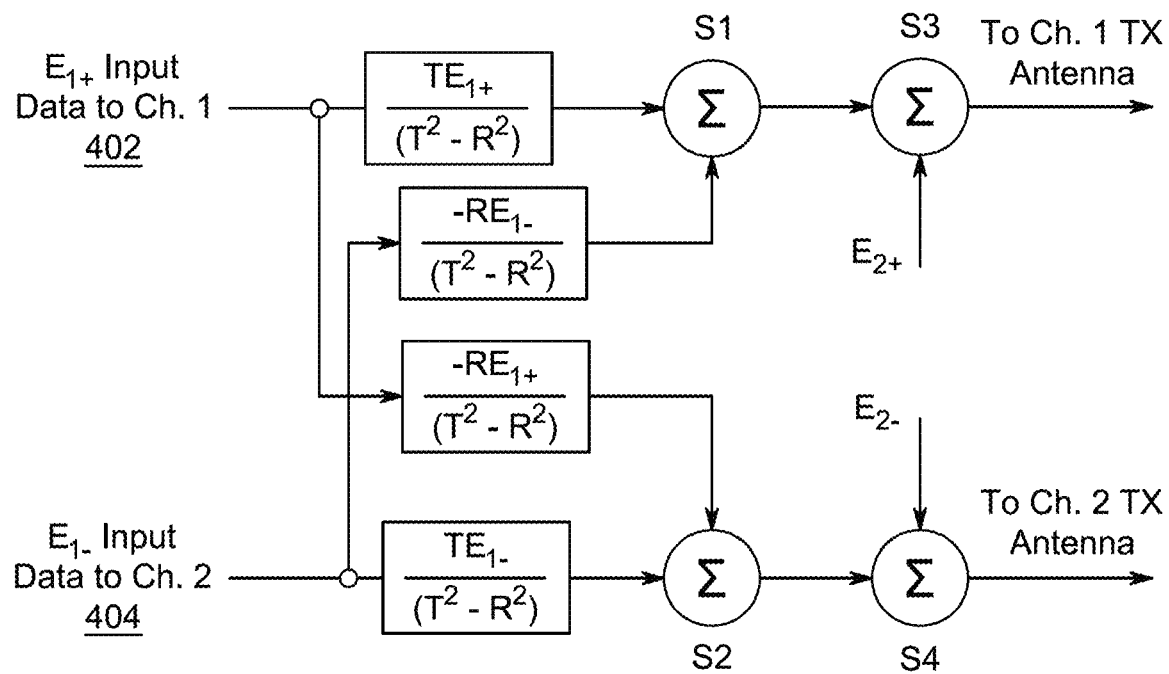
FIG. 4 illustrates the channel equalization process for mitigating crosstalk effects caused by the propagation of orthogonally polarized waves in an anisotropic medium, in accordance with an exemplary aspect of the disclosure.

FIG. 4 illustrates a signal equalization process applied to the input data before transmission in a dual-polarized MIMO antenna system. The equalization process is designed to counteract crosstalk effects that arise due to propagation through an anisotropic dusty environment. The signal equalization process is implemented for mitigating the signal distortions caused by the interaction of orthogonally polarized waves with airborne dust particles. These distortions introduce phase variations and polarization-dependent attenuation, leading to undesired signal leakage between polarization channels.

The input data to Channel 1 402 and the input data to Channel 2 404 undergo mathematical transformation within an equalization circuit prior to transmission. The equalization circuit applies compensation algorithms specifically designed to address polarization rotation and phase shifts induced by the anisotropic propagation medium. The equalization parameters are determined in real-time based on environmental factors, including dust concentration and propagation distance.

During the equalization process, the transmitted electric field components are decomposed into independent polarization states. The transformation process involves the application of weight coefficients, expressed as $$\frac{TE_{1+}}{(T^2 - R^2)}$$

and $$\frac{TE_{1-}}{(T^2 - R^2)},$$

correspond to calculated transmission factors for each polarization state corresponding to Channel 1 and Channel 2. Crosstalk effects induced by dust particles are represented by terms, such as $$\frac{-RE_{1-}}{(T^2 - R^2)}$$

and $$\frac{-RE_{1+}}{(T^2 - R^2)},$$

which quantity the polarization interference between the two channels.

Summation nodes S1 and S2 combine the corrected signal components. Each summation node aggregates the primary signal with compensatory terms derived from the orthogonal polarization channel. The operation is intended to neutralize the predicted crosstalk effects by introducing a controlled pre-distortion. The resulting signal components, $E_{+eq}$ and $E_{-eq}$, represent the adjusted outputs after compensation.

At summation nodes S3 and S4, the final equalized signals are generated for transmission. These signals are then transmitted through the dual-polarized antennas. The equalization process ensures that each polarization component retains its intended signal integrity by minimizing unwanted interference between channels.

At frequencies exceeding 20 GHz, the cross-polarization discrimination (XPD) factor begins to degrade, potentially reaching +20 dB, which renders the system ineffective. Therefore, the transmitted wave on each polarization within the MIMO system is electronically pre-shaped before it is fed into each antenna element on the transmitter side. A portion of the signal transmitted on one polarization is pre-shaped and then superimposed onto the signal transmitted on the other polarization, thereby addressing the degradation caused by cross-polarization interference. Equations defining the equalizer circuit principles are given as:

$$\begin{bmatrix} E'_{1+} \\ E'_{1-} \end{bmatrix} = \begin{bmatrix} T & R \\ R & T \end{bmatrix} \begin{bmatrix} E_{1+} \\ E_{1-} \end{bmatrix} \quad (19)$$

where, $$T = e^{-\frac{Loss_v}{2}} e^{-j\Phi_v} + e^{-\frac{Loss_h}{2}} e^{-j\Phi_h} \quad (20)$$

$$R = e^{-\frac{Loss_v}{2}} e^{-j\Phi_v} - e^{-\frac{Loss_h}{2}} e^{-j\Phi_h}$$

A technique of pre-shaping the input to each transmitting antenna of the MIMO system is explained by the following equations, $$\begin{bmatrix} E''_{1+} \\ E''_{1-} \end{bmatrix} = \begin{bmatrix} T & R \\ R & T \end{bmatrix} \begin{bmatrix} E_{+eq} \\ E_{-eq} \end{bmatrix} = \begin{bmatrix} E_{1+} \\ E_{1-} \end{bmatrix} \quad (21)$$

$$\begin{bmatrix} E_{+eq} \\ E_{-eq} \end{bmatrix} = \begin{bmatrix} T & R \\ R & T \end{bmatrix}^{-1} \begin{bmatrix} E_{1+} \\ E_{1-} \end{bmatrix} = \frac{1}{(T^2 - R^2)} \begin{bmatrix} T & -R \\ -R & T \end{bmatrix} \begin{bmatrix} E_{1+} \\ E_{1-} \end{bmatrix} \quad (22)$$

where $E_{+eq}$ and $E_{-eq}$ are the equalized signals that should be fed to transmitting antennas of the MIMO system and given by, $$E_{+eq} = \frac{TE_{1+} - RE_{1-}}{(T^2 - R^2)} \quad (23)$$

$$E_{-eq} = \frac{TE_{1-} - RE_{1+}}{(T^2 - R^2)}$$

Equalization is performed only for polarization components aligned in the vertical plane, as the components in the horizontal plane do not experience polarization rotation due to the isotropic nature of the dust medium.

The frequency of dynamic adjustments to the compensation parameters of the system depends on the selected transmission mode, which can function in one of two configurations, denoted as a continuous transmission mode and a packet-based transmission mode.

In the continuous transmission mode, data is transmitted without interruption, requiring real-time updates to compensation parameters such as the dust level and the UAV height. Since dust levels fluctuate, the system continuously perform measurements and adjustments to ensure optimal signal quality. Immediate adjustments are essential in this mode, as any delay in compensation could significantly degrade the transmitted signal.

In the packet-based transmission mode, data is sent in discrete packets rather than as a continuous stream. The equalization circuit recalibrates immediately before each packet is transmitted, ensuring that the most recent environmental data, including dust-level measurements, is incorporated into the compensation settings. By making adjustments just before transmission, the system maintains high performance while minimizing the computational burden that continuous updates may entail.

Figure 5:
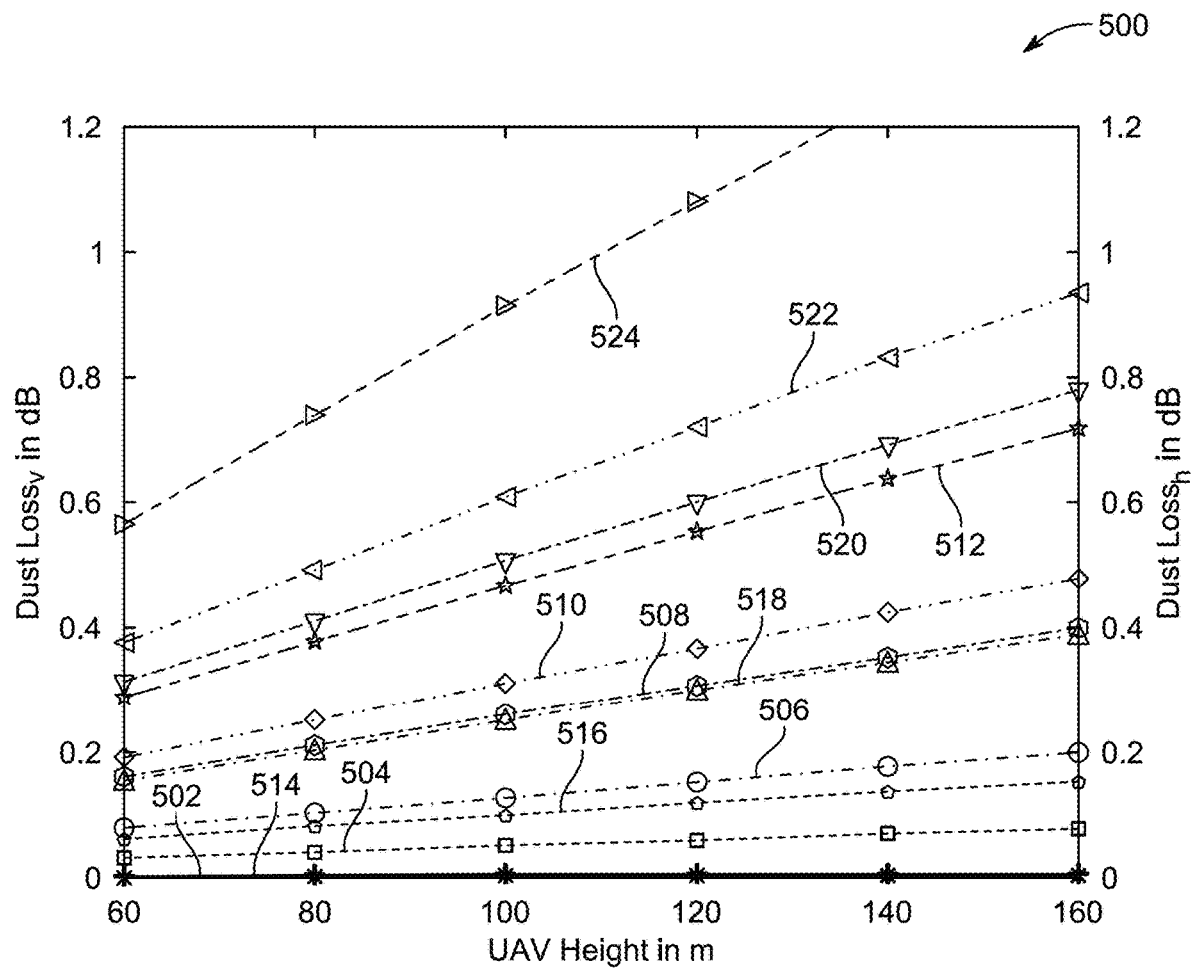
FIG. 5 illustrates the attenuation factors affecting both horizontally and vertically polarized waves during their propagation from the UAV unit to the ground as a function of UAV height at different frequencies for a ground visibility of 200 m, in accordance with an exemplary aspect of the disclosure.

FIG. 5 illustrates the attenuation characteristics affecting the propagation of both horizontally and vertically polarized electromagnetic waves as they travel from a UAV unit to a ground-based receiver. The attenuation is analyzed as a function of the UAV height, evaluated at different operational frequencies ranging from 1 GHz to 180 GHz, under a visibility condition of 200 meters.

The graphical representation in FIG. 5 demonstrates that signal attenuation increases with UAV altitude due to the extended propagation path through the anisotropic dusty medium. Higher frequencies exhibit greater susceptibility to attenuation, as represented by the increasing dust loss values plotted against the UAV height. The graph shows separate loss curves for vertical polarization and horizontal polarization, denoted respectively as αV' and αH', indicating the differential impact of dust-induced attenuation on each polarization state.

For lower frequency bands such as 1 GHz, the attenuation remains minimal across different UAV heights, as the signal exhibits lower sensitivity to dust-induced scattering. However, as the operating frequency increases to mid-range values, such as 20 GHz and 50 GHZ, the attenuation progressively rises, with noticeable divergence between the losses experienced by vertically and horizontally polarized waves. At even higher frequencies beyond 100 GHz, including 120 GHz and 180 GHz, the attenuation effect intensifies significantly, resulting in substantial energy loss before the signal reaches the ground receiver.

Figure 6:
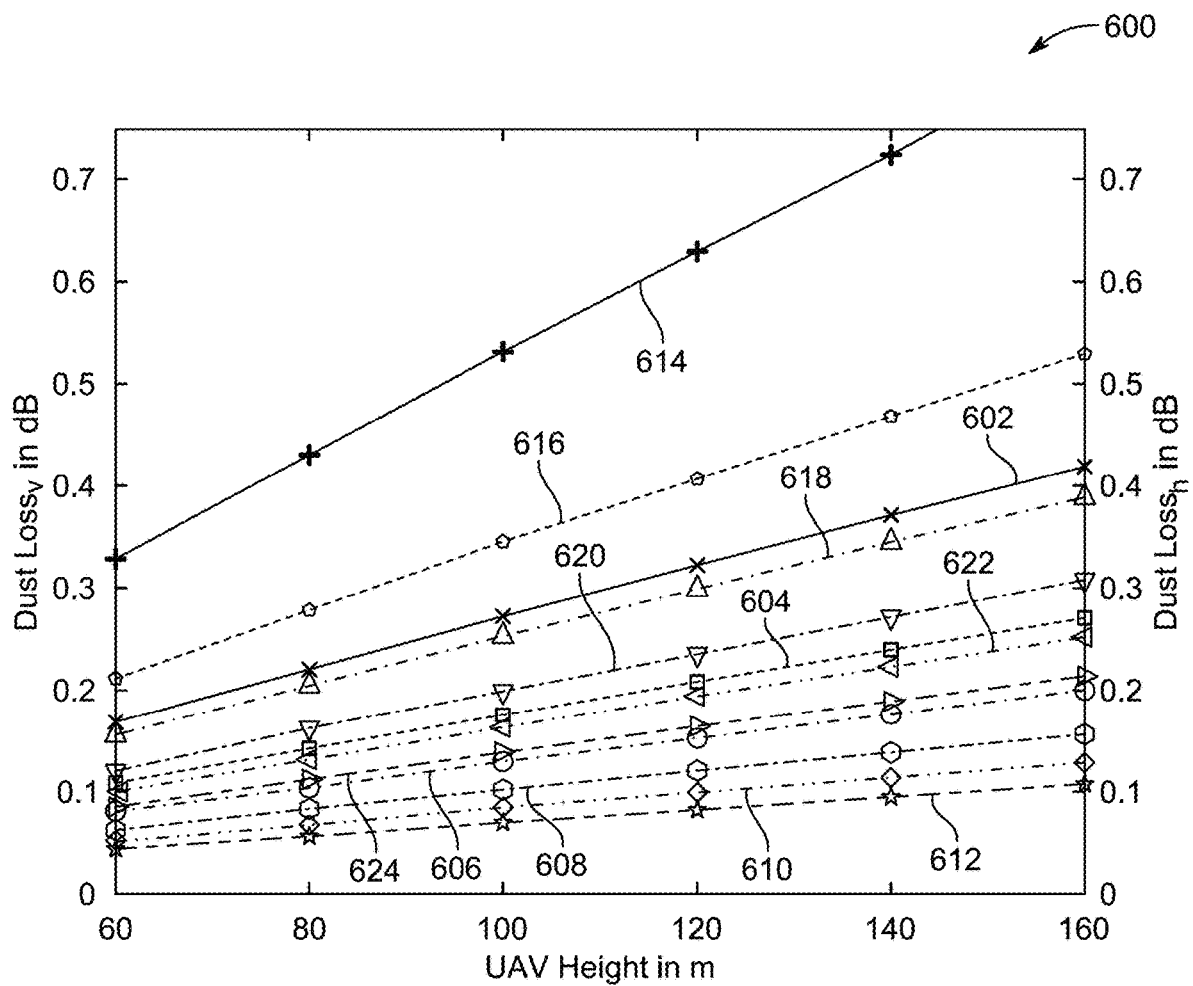
FIG. 6 illustrates the attenuation factors affecting both horizontally and vertically polarized waves during their propagation from the UAV unit to the ground as a function of UAV height at different values of ground visibility for a frequency of 50 GHz, in accordance with an exemplary aspect of the disclosure.

FIG. 6 illustrates the variation in attenuation experienced by horizontally and vertically polarized waves as they propagate from a UAV to a ground-based receiving unit in the presence of dust particles. In a graph 600, the attenuation is shown as a function of UAV height at different values of ground visibility, where the transmission frequency is 50 GHz. The attenuation factors are analyzed to determine their dependency on ground visibility, which influences the strength and integrity of received signals. The graph 600 shows separate loss curves for vertical polarization and horizontal polarization, denoted respectively as $Loss_V$ and $Loss_H$.

Curve 602 represents attenuation associated with a ground visibility of 0.1 km. Curve 604 represents attenuation for a visibility of 0.15 km. Curve 606 represents attenuation for a visibility of 0.2 km. Curve 608 represents attenuation for a visibility of 0.25 km. Curve 610 represents attenuation for a visibility of 0.3 km. Curve 612 represents attenuation for a visibility of 0.35 km.

The attenuation curves indicate that as the UAV height increases, the signal experiences greater degradation due to the longer propagation distance through the dust-laden medium. Vertically polarized waves exhibit higher attenuation than horizontally polarized waves, particularly at lower visibilities, as shown in the respective attenuation curves.

Curve 614 represents the loss of horizontally polarized waves for a visibility of 0.1 km. Curve 616 represents the loss of horizontally polarized waves for a visibility of 0.15 km. Curve 618 represents the loss of horizontally polarized waves for a visibility of 0.2 km. Curve 620 represents the loss of horizontally polarized waves for a visibility of 0.25 km. Curve 622 represents the loss of horizontally polarized waves for a visibility of 0.3 km. Curve 624 represents the loss of horizontally polarized waves for a visibility of 0.35 km.

The attenuation behavior observed in FIG. 6 demonstrates the influence of ground-level dust concentration on the signal degradation of UAV-based communication systems. As ground visibility decreases, both vertical and horizontal signal components experience increased attenuation due to higher dust density. The differential attenuation observed in the vertically and horizontally polarized waves indicates that polarization-dependent losses must be considered when designing communication systems operating in dust-prone environments.

Figure 7:
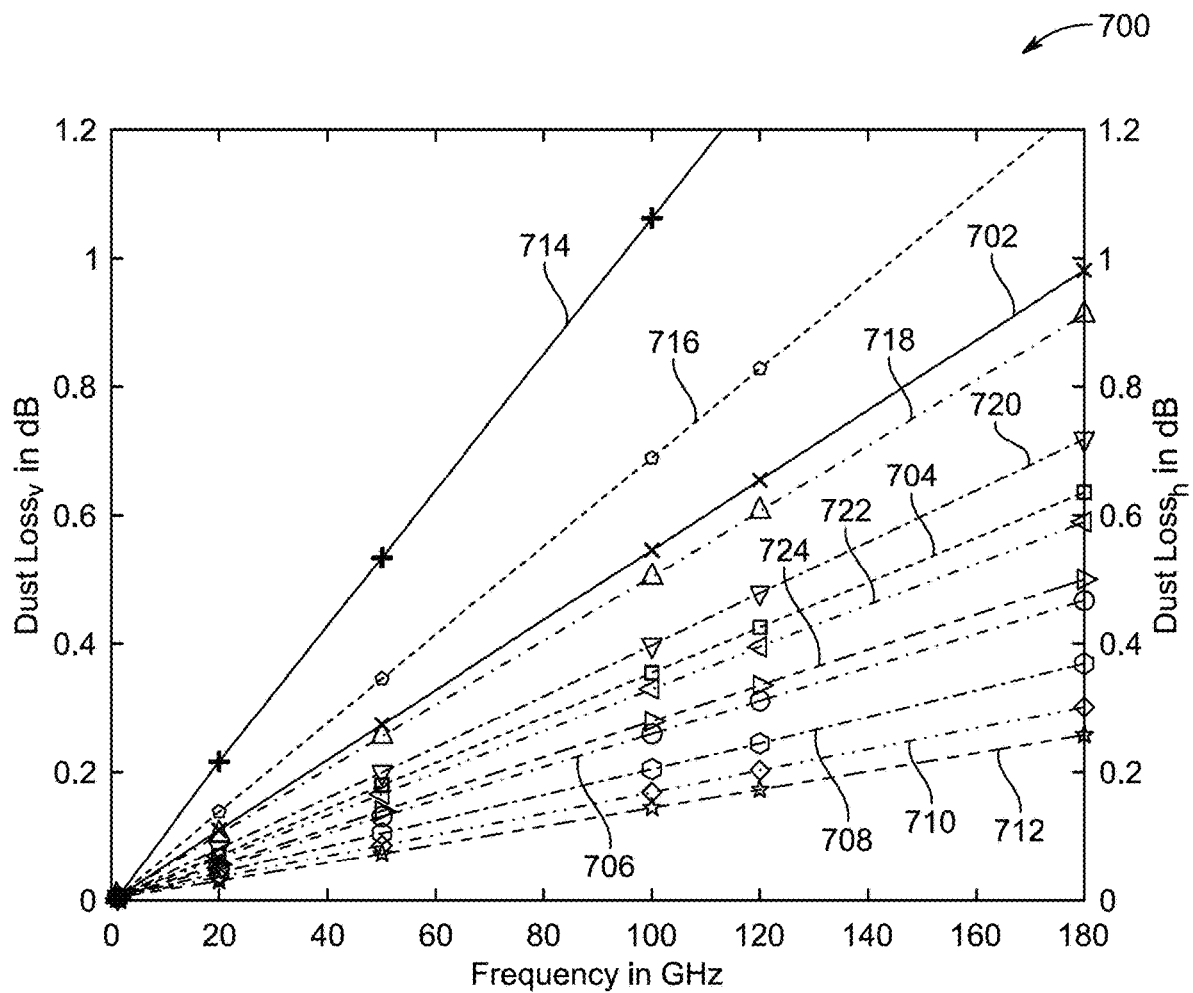
FIG. 7 illustrates the attenuation factors affecting both horizontally and vertically polarized waves during their propagation from the UAV unit to the ground as a function of frequency at different levels of ground visibility for a UAV at a height of 100 m, in accordance with an exemplary aspect of the disclosure.

FIG. 7 illustrates the attenuation factors affecting both horizontally and vertically polarized waves during their propagation from the UAV unit to the ground as a function of frequency at different levels of ground visibility for a UAV height of 100 meters. In a graph 700, the attenuation factors are represented for various levels of ground visibility, with each curve corresponding to a specific ground visibility condition. The attenuation values are shown along the vertical axis, while the frequency in gigahertz (GHz) is represented along the horizontal axis. The graph 700 shows separate loss curves for vertical polarization and horizontal polarization, denoted respectively as $Loss_V$ and $Loss_H$.

Curve 702 represents attenuation associated with a ground visibility of 0.1 km. Curve 704 represents attenuation for a ground visibility of 0.15 km. Curve 706 represents attenuation corresponding to a ground visibility of 0.2 km. Curve 708 represents attenuation associated with a ground visibility of 0.25 km. Curve 710 represents attenuation corresponding to a ground visibility of 0.3 km. Curve 712 represents attenuation associated with a ground visibility of 0.35 km.

Curve 714 represents attenuation due to horizontal polarization effects at a ground visibility of 0.1 km. Curve 716 represents attenuation associated with horizontal polarization for a ground visibility of 0.15 km. Curve 718 represents attenuation resulting from horizontal polarization for a ground visibility of 0.2 km. Curve 720 represents attenuation due to horizontal polarization at a ground visibility of 0.25 km. Curve 722 represents attenuation associated with horizontal polarization at a ground visibility of 0.3 km. Curve 724 represents attenuation due to horizontal polarization effects for a ground visibility of 0.35 km.

The data presented in FIG. 7 illustrates the dependency of attenuation on frequency across various visibility conditions. The attenuation levels increase with frequency due to higher interaction of electromagnetic waves with dust particles present in the propagation environment. The attenuation trends also indicate that lower visibility conditions lead to higher attenuation, affecting both horizontally and vertically polarized signals. The variations in attenuation between vertical and horizontal polarization indicate differential absorption and scattering effects, which can significantly impact communication reliability in dusty environments.

For frequencies below 50 GHz, the attenuation levels remain relatively low for all visibility conditions. As the frequency increases beyond 100 GHz, the attenuation levels show a significant rise, particularly for lower visibility conditions such as 0.1 km and 0.15 km. This trend highlights the challenges faced by high-frequency communication systems operating in regions with heavy airborne particulate matter.

Figure 8:
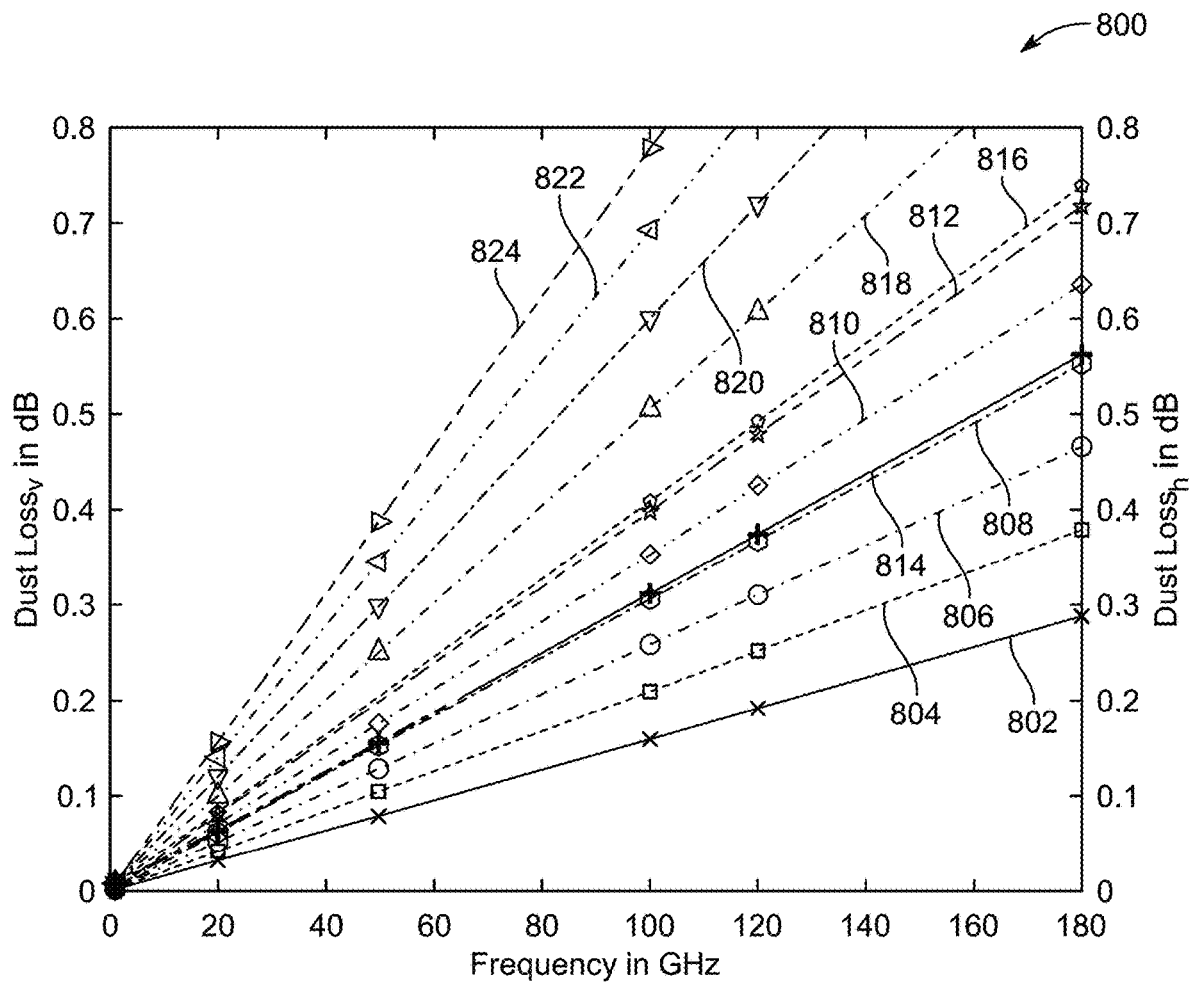
FIG. 8 illustrates the attenuation factors affecting both horizontally and vertically polarized waves during their propagation from the UAV unit to the ground as a function of frequency for different UAV heights and for a ground visibility of 200 m, in accordance with an exemplary aspect of the disclosure.

FIG. 8 illustrates the attenuation factors affecting both horizontally and vertically polarized waves during their propagation from the UAV unit to the ground as a function of frequency at different UAV heights. In a graph 800, the attenuation characteristics are represented for various UAV heights, with each curve corresponding to a different height value. The graph 800 shows separate loss curves for vertical polarization and horizontal polarization, denoted respectively as $Loss_V$ and $Loss_H$.

Curve 802 represents attenuation associated with a UAV height of 0.06 meters. Curve 804 represents attenuation for a UAV height of 0.08 meters. Curve 806 represents attenuation for a UAV height of 0.1 meters. Curve 820 represents attenuation for a UAV height of 0.12 meters. Curve 822 represents attenuation for a UAV height of 0.14 meters. Curve 824 represents attenuation for a UAV height of 0.16 meters.

The graph illustrates how dust-induced signal loss varies with different UAV heights. The x-axis represents the frequency in gigahertz (GHz), and the y-axis represents dust loss in decibels (dB). The attenuation is shown separately for vertically and horizontally polarized signals. The legend in the FIG. 8 distinguishes between losses associated with each polarization mode.

At lower frequencies, the dust-induced attenuation remains relatively minimal for all UAV heights. As the frequency increases, attenuation levels rise, with a more significant impact observed at higher UAV heights. This trend indicates that higher UAV altitudes are more susceptible to dust-induced signal degradation, particularly at millimeter-wave frequencies.

The vertically polarized wave experiences greater attenuation compared to the horizontally polarized wave. This difference is attributed to the anisotropic nature of the propagation medium, where dust particles preferentially affect the vertical polarization component of the transmitted signal.

Figure 9:
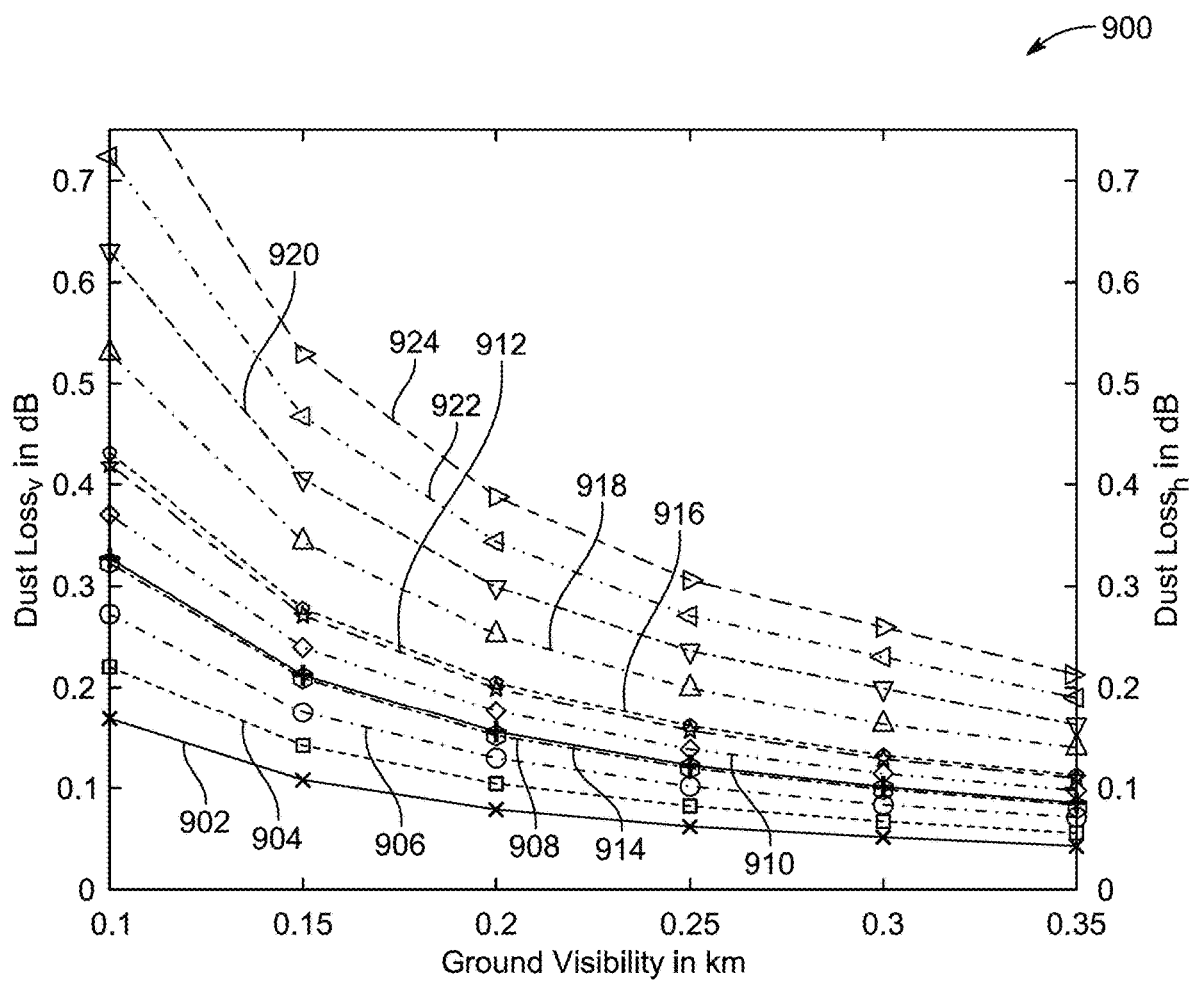
FIG. 9 illustrates the attenuation factors affecting both horizontally and vertically polarized waves during their propagation from the UAV unit to the ground as a function of ground visibility for different UAV heights at a frequency of 50 GHz, in accordance with an exemplary aspect of the disclosure.

FIG. 9 illustrates the attenuation factors influencing both horizontally and vertically polarized waves as they propagate from a UAV unit to the ground. The attenuation is analyzed as a function of ground visibility at different UAV heights, specifically for a frequency of 50 GHz. A graph 900 illustrates the variations in attenuation under different atmospheric conditions, allowing adjustments to be made to optimize signal transmission. The graph 900 shows separate loss curves for vertical polarization and horizontal polarization, denoted respectively as $Loss_V$ and $Loss_H$.

Curve 902 represents attenuation associated with a UAV height of 60 meters. Curve 904 represents attenuation for a UAV height of 80 meters. Curve 906 represents attenuation for a UAV height of 100 meters. Curve 908 represents attenuation for a UAV height of 120 meters. Curve 910 represents attenuation for a UAV height of 140 meters. Curve 912 represents attenuation for a UAV height of 160 meters. Curve 914 represents attenuation for a UAV height of 180 meters. Curve 916 represents attenuation for a UAV height of 200 meters. Curve 918 represents attenuation for a UAV height of 220 meters. Curve 920 represents attenuation for a UAV height of 240 meters. Curve 922 represents attenuation for a UAV height of 260 meters. Curve 924 represents attenuation for a UAV height of 280 meters.

As observed, the attenuation of both horizontal and vertical polarization decreases as ground visibility increases. This relationship is more pronounced at lower altitudes, where the UAV signal experiences stronger dust-induced scattering effects. By analyzing these curves, real-time adjustments can be implemented in the UAV communication system to maintain reliable data transmission by compensating for dust-induced losses.

Figure 10:
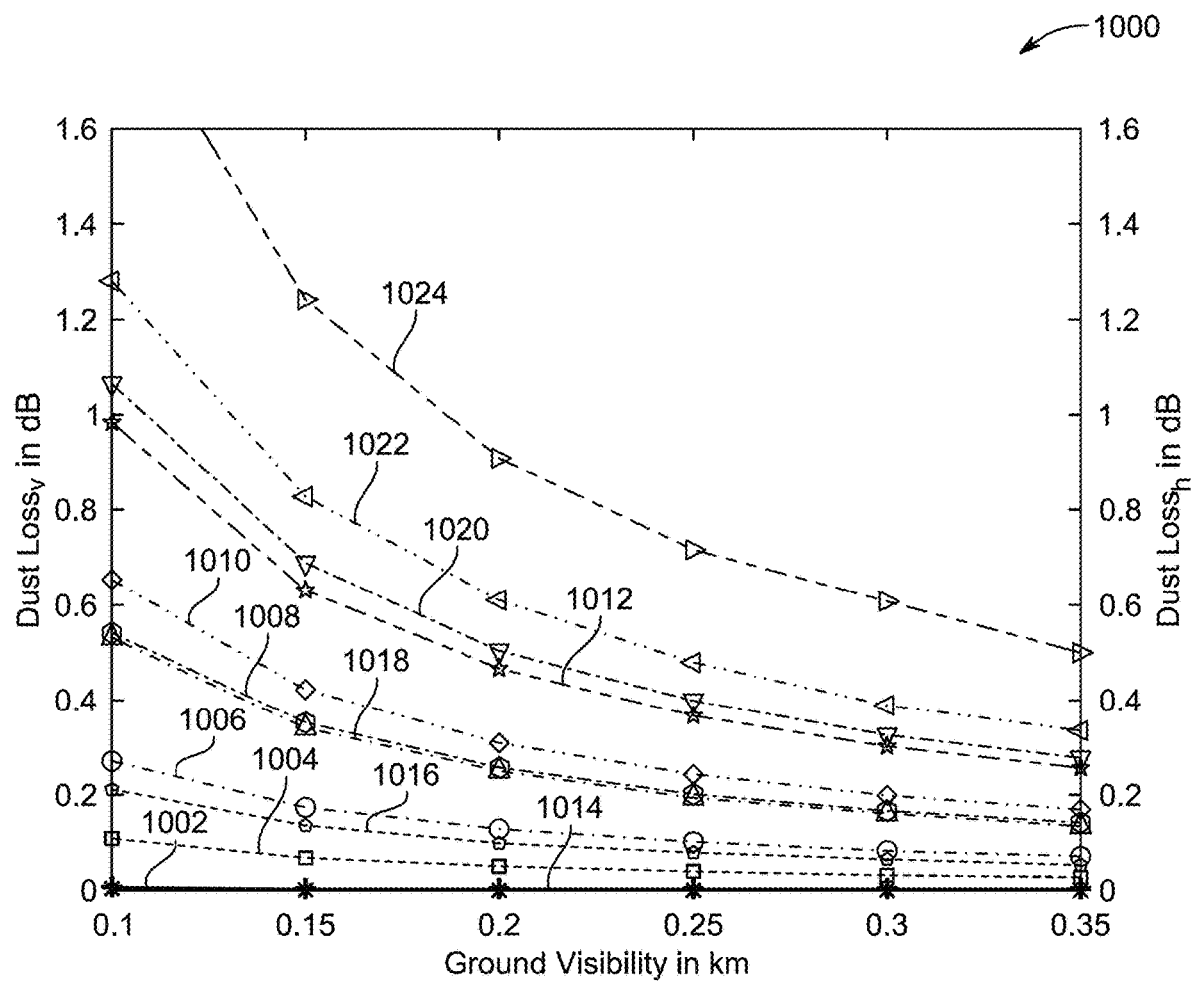
FIG. 10 illustrates the attenuation factors affecting both horizontally and vertically polarized waves during their propagation from the UAV unit to the ground as a function of ground visibility for different frequencies and for a UAV height of 200 m, in accordance with an exemplary aspect of the disclosure.

FIG. 10 illustrates the attenuation factors affecting both horizontally and vertically polarized waves as they propagate from a UAV unit to the ground. The attenuation is analyzed as a function of ground visibility for different frequencies, specifically for a UAV height of 200 meters. A graph 1000 provides an analysis of how signal degradation varies under different atmospheric conditions, emphasizing the impact of dust-induced attenuation. The graph 1000 shows separate loss curves for vertical polarization and horizontal polarization, denoted respectively as $Loss_V$ and $Loss_H$.

Curve 1002 represents attenuation associated with a frequency of 1 GHz. Curve 1004 represents attenuation for a frequency of 20 GHz. Curve 1006 represents attenuation for a frequency of 50 GHz. Curve 1008 represents attenuation for a frequency of 100 GHz. Curve 1010 represents attenuation for a frequency of 120 GHz. Curve 1012 represents attenuation for a frequency of 180 GHz. Curve 1014 represents attenuation for a horizontally polarized signal at 1 GHz. Curve 1016 represents attenuation for a horizontally polarized signal at 20 GHz. Curve 1018 represents attenuation for a horizontally polarized signal at 50 GHz. Curve 1020 represents attenuation for a horizontally polarized signal at 100 GHz. Curve 1022 represents attenuation for a horizontally polarized signal at 120 GHz. Curve 1024 represents attenuation for a horizontally polarized signal at 180 GHz.

As depicted in the graph 1000 attenuation decreases as ground visibility increases, with higher attenuation values observed at lower visibility levels. Additionally, the attenuation is more pronounced at higher frequencies, where dust particles in the atmosphere cause greater scattering and absorption effects. This trend is evident for both horizontally and vertically polarized signals, although the impact on vertical polarization is slightly more significant. The graphical representation demonstrates the necessity for dynamic equalization in UAV communication systems to compensate for variations in atmospheric conditions, ensuring stable signal transmission even in dusty environments.

Figure 11:
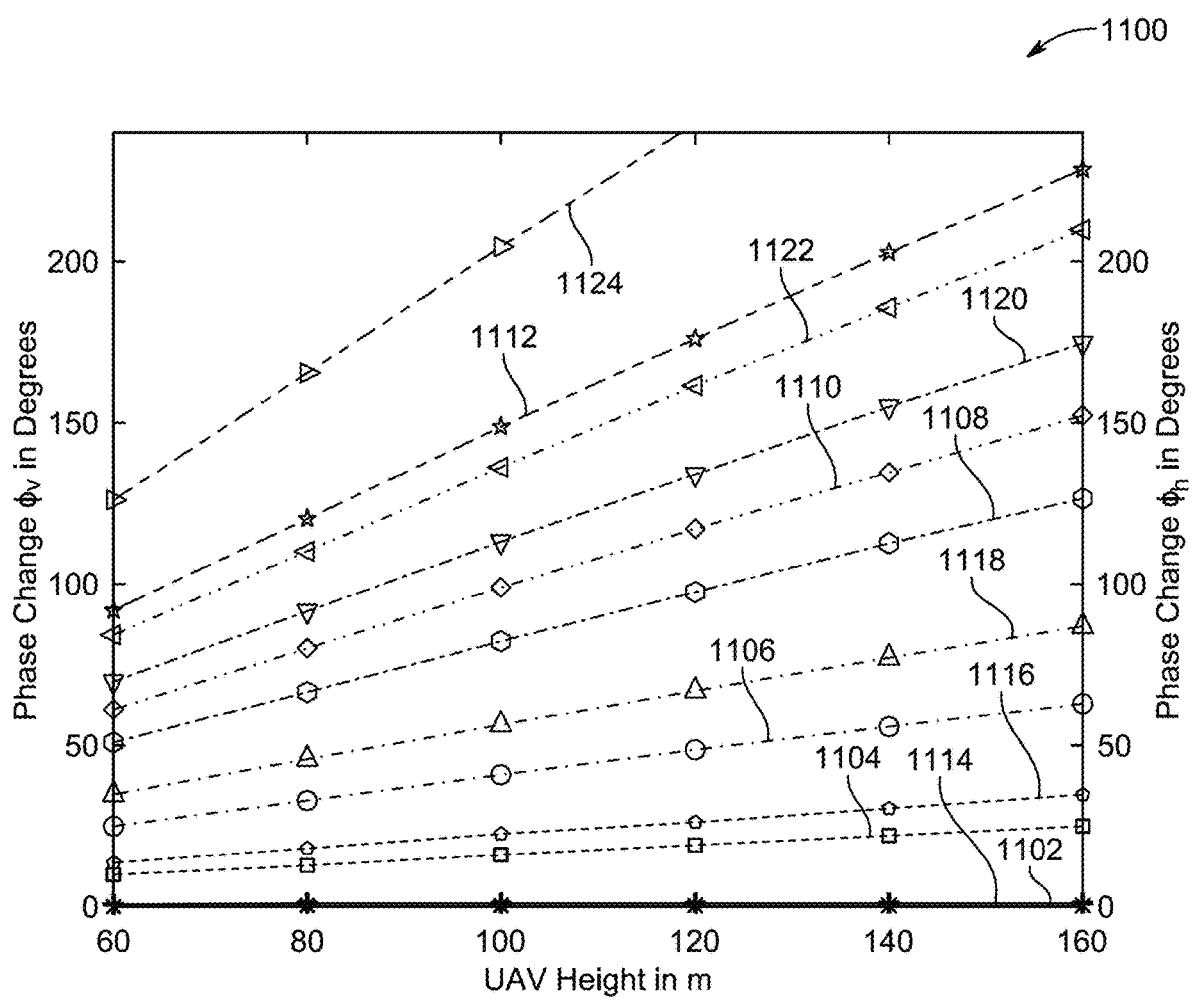
FIG. 11 illustrates the phase shift experienced by both horizontally and vertically polarized waves during their propagation from the UAV unit to the ground as a function of UAV height at different frequencies and for a ground visibility of 200 m, in accordance with an exemplary aspect of the disclosure.

FIG. 11 illustrates the phase shift experienced by both horizontally and vertically polarized waves as they propagate from a UAV unit to the ground. The phase shift is analyzed as a function of UAV height at different operating frequencies, specifically for a ground visibility of 200 meters. A graph 1100 depict how the phase change varies across multiple frequency levels, providing insights into the effect of UAV altitude on signal distortion. The graph shows separate phase change curves for vertical polarization and horizontal polarization, denoted respectively as $\phi_v$ and $\phi_h$.

Curve 1102 represents the phase shift for a frequency of 1 GHz. Curve 1104 represents the phase shift for a frequency of 20 GHz. Curve 1106 represents the phase shift for a frequency of 50 GHz. Curve 1108 represents the phase shift for a frequency of 111 GHz. Curve 1110 represents the phase shift for a frequency of 120 GHz. Curve 1112 represents the phase shift for a frequency of 180 GHz. Curve 1114 represents the phase shift for a frequency of 1 GHz. Curve 1116 represents the phase shift for a frequency of 20 GHz. Curve 1118 represents the phase shift for a frequency of 111 GHz. Curve 1120 represents the phase shift for a frequency of 111 GHz. Curve 1122 represents the phase shift for a frequency of 120 GHz. Curve 1124 represents the phase shift for a frequency of 180 GHz.

The phase shift increases with UAV height, with higher frequency waves exhibiting more pronounced variations. This trend indicates that signal processing adjustments are required to compensate for the increasing phase distortion at elevated altitudes.

Figure 12:
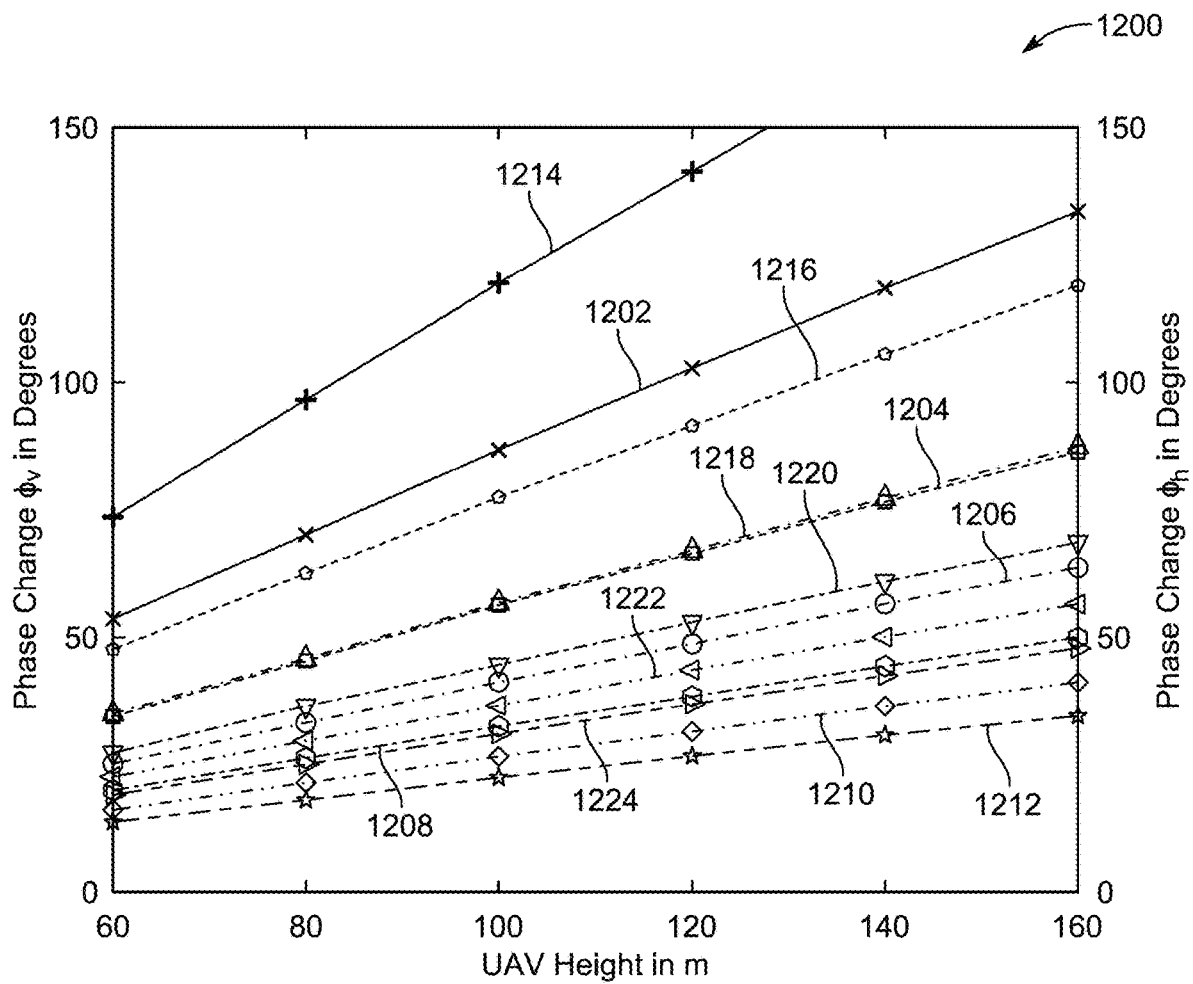
FIG. 12 illustrates the phase shift experienced by both horizontally and vertically polarized waves during their propagation from the UAV unit to the ground as a function of UAV height for different levels of ground visibility at a frequency of 50 GHz, in accordance with an exemplary aspect of the disclosure.

FIG. 12 illustrates the phase shift experienced by both horizontally and vertically polarized waves as they propagate from a UAV unit to the ground. The phase shift is analysed as a function of UAV height for different levels of ground visibility at a frequency of 50 GHz. A graph 1200 illustrates the variations in phase shift at different altitudes and visibility conditions. The graph 1200 shows separate phase change curves for vertical polarization and horizontal polarization, denoted respectively as $\phi_v$ and $\phi_h$.

Curve 1202 represents the phase shift for a ground visibility of 0.1 km. Curve 1204 represents the phase shift for a ground visibility of 0.15 km. Curve 1206 represents the phase shift for a ground visibility of 0.2 km. Curve 1208 represents the phase shift for a ground visibility of 0.25 km. Curve 1210 represents the phase shift for a ground visibility of 0.3 km. Curve 1212 represents the phase shift for a ground visibility of 0.35 km. Curve 1214 represents the phase shift for a ground visibility of 0.4 km. Curve 1216 represents the phase shift for a ground visibility of 0.45 km. Curve 1218 represents the phase shift for a ground visibility of 0.5 km. Curve 1220 represents the phase shift for a ground visibility of 0.55 km. Curve 1222 represents the phase shift for a ground visibility of 0.6 km. Curve 1224 represents the phase shift for a ground visibility of 0.65 km.

The phase shift increases as the UAV height increases. At lower visibilities, the phase shift is more pronounced due to the increased impact of dust particles on the propagating waves. Higher visibility levels result in reduced phase shifts, indicating that clearer atmospheric conditions contribute to less distortion in signal transmission.

Figure 13:
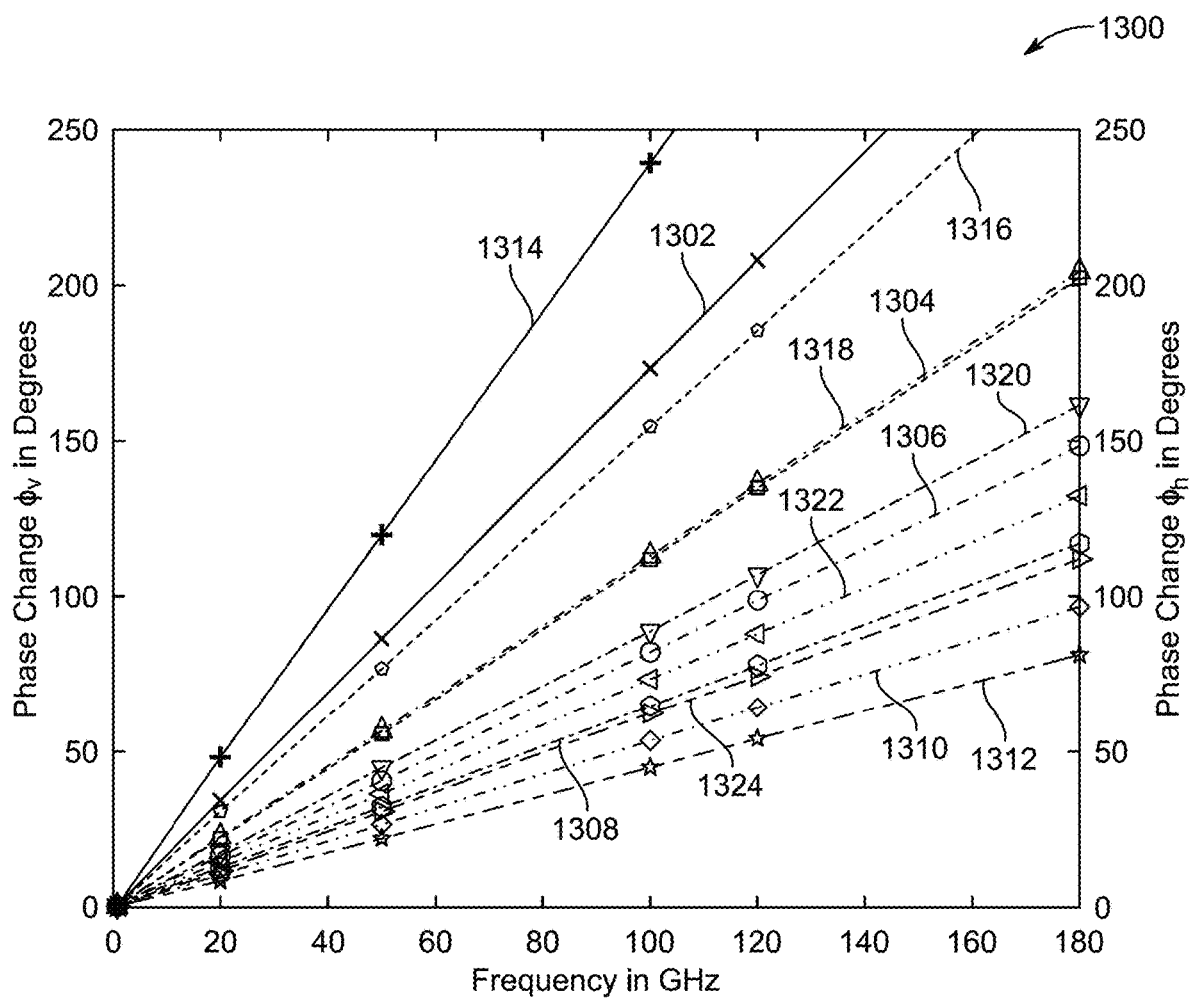
FIG. 13 illustrates the phase shift experienced by both horizontally and vertically polarized waves during their propagation from the UAV unit to the ground as a function of frequency at different levels of ground visibility for a UAV at a height of 100 m, in accordance with an exemplary aspect of the disclosure.

FIG. 13 illustrates the phase shift experienced by both horizontally and vertically polarized waves as they propagate from a UAV unit to the ground. The phase shift is analyzed as a function of frequency at different levels of ground visibility for a UAV positioned at a height of 100 meters. A graph 1300 illustrates the variations in phase shift across different frequency bands and visibility conditions. The graph 1200 shows separate phase change curves for vertical polarization and horizontal polarization, denoted respectively as $\phi_v$ and $\phi_h$.

Curve 1302 represents the phase shift for a ground visibility of 0.1 km. Curve 1304 represents the phase shift for a ground visibility of 0.15 km. Curve 1306 represents the phase shift for a ground visibility of 0.2 km. Curve 1308 represents the phase shift for a ground visibility of 0.25 km. Curve 1310 represents the phase shift for a ground visibility of 0.3 km. Curve 1312 represents the phase shift for a ground visibility of 0.35 km. Curve 1314 represents the phase shift for a ground visibility of 0.4 km. Curve 1316 represents the phase shift for a ground visibility of 0.45 km. Curve 1318 represents the phase shift for a ground visibility of 0.5 km. Curve 1320 represents the phase shift for a ground visibility of 0.55 km. Curve 1322 represents the phase shift for a ground visibility of 0.6 km. Curve 1324 represents the phase shift for a ground visibility of 0.65 km.

The phase shift increases with increasing frequency, demonstrating that higher frequency waves experience greater phase deviations due to the presence of dust particles in the propagation medium. The phase shift is more pronounced for lower visibility levels, indicating a stronger influence of dust-induced scattering and refraction effects.

Figure 14:
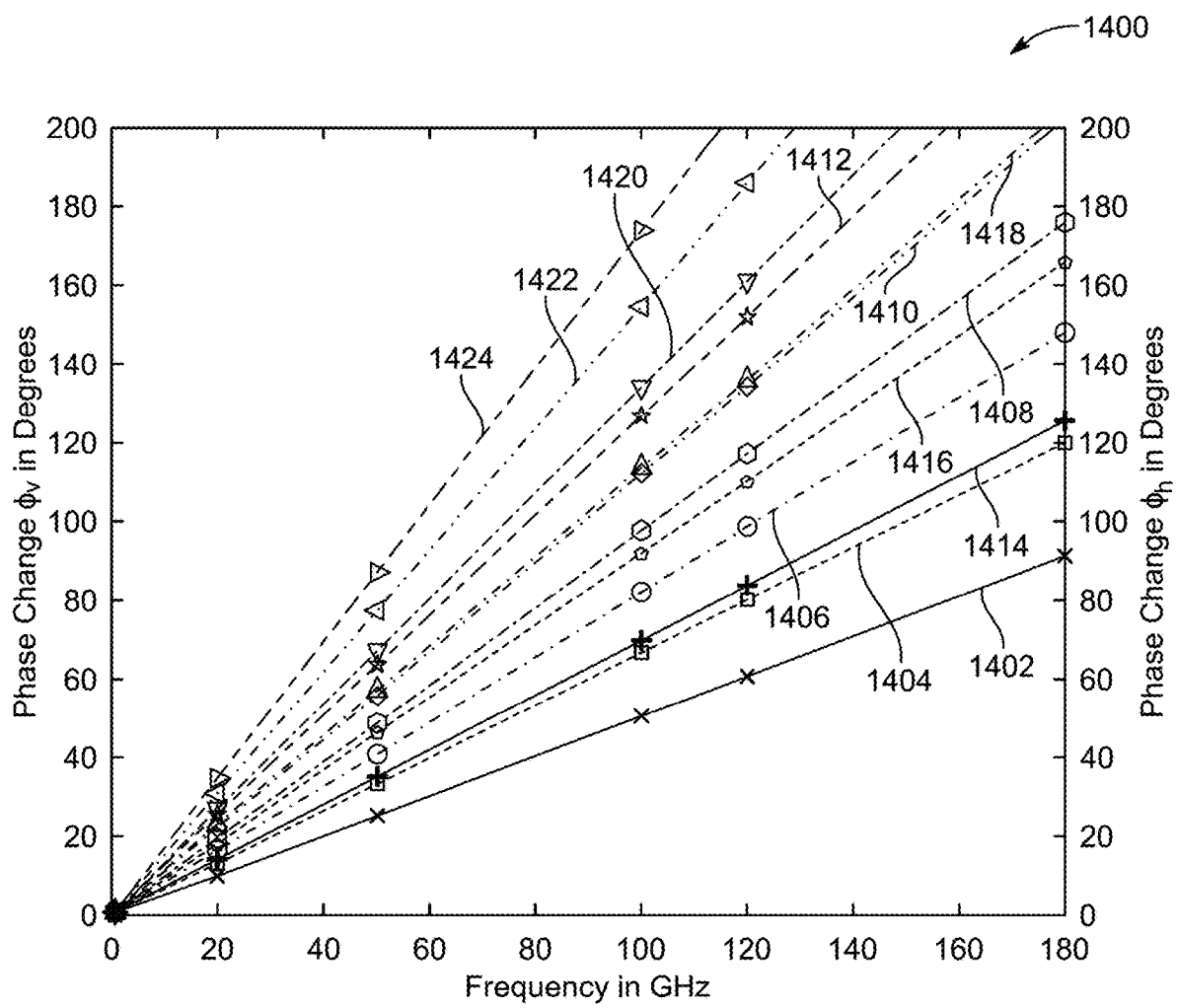
FIG. 14 illustrates the phase shift experienced by both horizontally and vertically polarized waves during their propagation from the UAV unit to the ground as a function of frequency for different UAV heights and for a ground visibility of 200 m, in accordance with an exemplary aspect of the disclosure.

FIG. 14 illustrates the phase shift experienced by both horizontally and vertically polarized waves as they propagate from a UAV unit to the ground. The phase shift is analyzed as a function of frequency for different UAV heights and for a ground visibility of 200 meters. A graph 1400 illustrates the variations in phase shift under different conditions. The graph 1400 shows separate phase change curves for vertical polarization and horizontal polarization, denoted respectively as $\phi_v$ and $\phi_h$.

Curve 1402 represents the phase shift associated with a UAV height of 0.06 meters. Curve 1404 represents the phase shift for a UAV height of 0.08 meters. Curve 1406 represents the phase shift for a UAV height of 0.1 meters. Curve 1408 represents the phase shift for a UAV height of 0.12 meters. Curve 1410 represents the phase shift for a UAV height of 0.14 meters. Curve 1412 represents the phase shift for a UAV height of 0.16 meters. Curve 1414 represents the phase shift for a UAV height of 0.18 meters. Curve 1416 represents the phase shift for a UAV height of 0.2 meters. Curve 1418 represents the phase shift for a UAV height of 0.22 meters. Curve 1420 represents the phase shift for a UAV height of 0.24 meters. Curve 1422 represents the phase shift for a UAV height of 0.26 meters. Curve 1424 represents the phase shift for a UAV height of 0.28 meters.

As observed, the phase shift for both horizontal and vertical polarization increases with frequency. The dependency on UAV height becomes more pronounced at higher frequencies, where variations in phase change are more significant.

Figure 15:
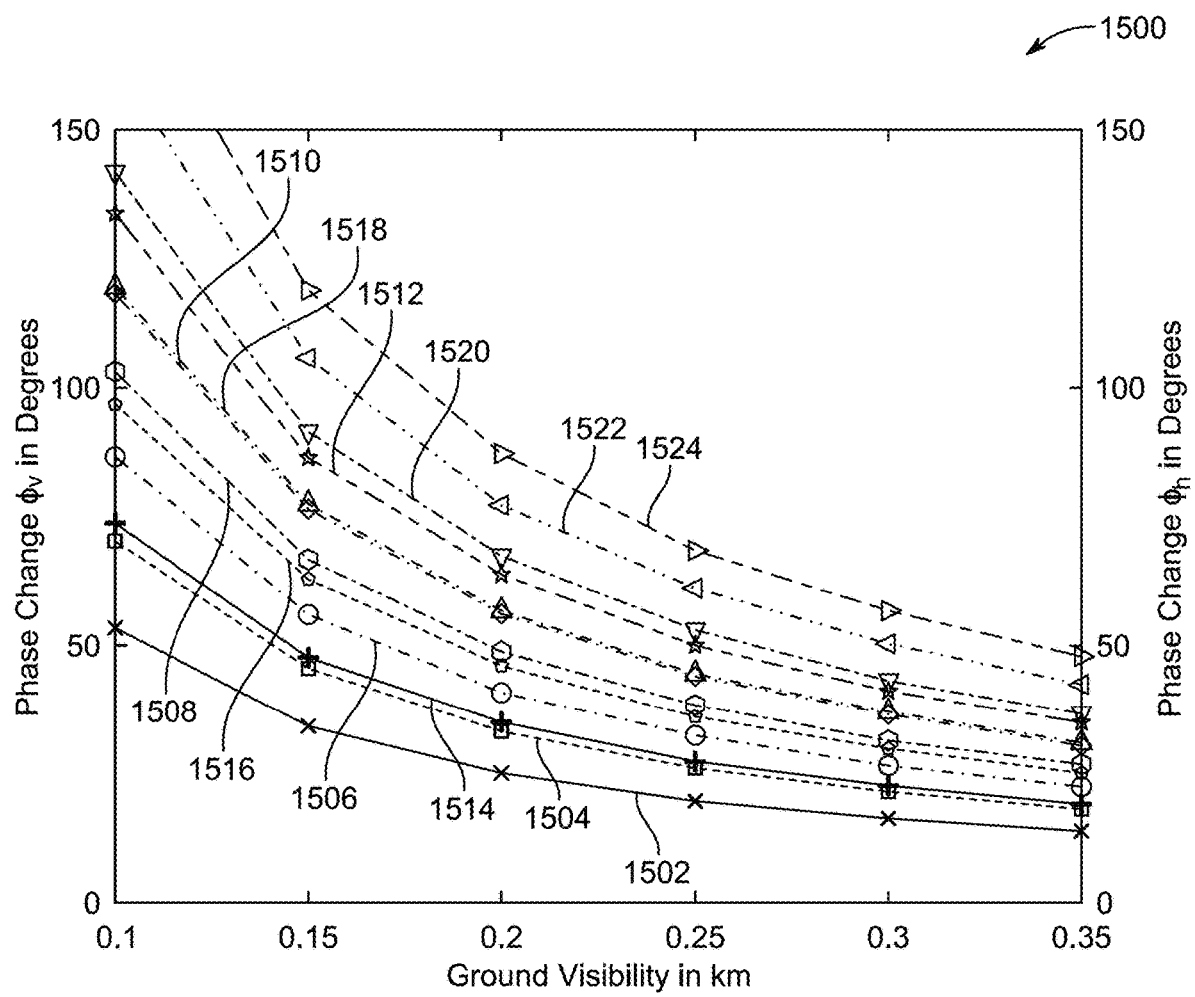
FIG. 15 illustrates the phase shift experienced by both horizontally and vertically polarized waves during their propagation from the UAV unit to the ground as a function of ground visibility for different UAV heights at a frequency of 50 GHz, in accordance with an exemplary aspect of the disclosure.

FIG. 15 illustrates the phase shift experienced by both horizontally and vertically polarized waves as they propagate from a UAV unit to the ground. The phase shift is analyzed as a function of ground visibility for different UAV heights and for a frequency of 50 GHz. A graph 1500 illustrates the variations in phase shift under different atmospheric conditions. The graph 1500 shows separate phase change curves for vertical polarization and horizontal polarization, denoted respectively as $\phi_v$ and $\phi_h$.

Curve 1502 represents the phase shift associated with a UAV height of 60 meters. Curve 1504 represents the phase shift for a UAV height of 80 meters. Curve 1506 represents the phase shift for a UAV height of 100 meters. Curve 1508 represents the phase shift for a UAV height of 120 meters. Curve 1510 represents the phase shift for a UAV height of 140 meters. Curve 1512 represents the phase shift for a UAV height of 160 meters. Curve 1514 represents the phase shift for a UAV height of 180 meters. Curve 1516 represents the phase shift for a UAV height of 200 meters. Curve 1518 represents the phase shift for a UAV height of 220 meters. Curve 1520 represents the phase shift for a UAV height of 240 meters. Curve 1522 represents the phase shift for a UAV height of 260 meters. Curve 1524 represents the phase shift for a UAV height of 280 meters.

As observed, the phase shift of both horizontal and vertical polarization decreases as ground visibility increases. This relationship is more pronounced at lower UAV heights, where the UAV signal undergoes stronger dust-induced scattering effects. The reduction in phase shift with increasing ground visibility indicates that the impact of dust particles on the wave propagation diminishes as visibility improves.

Figure 16:
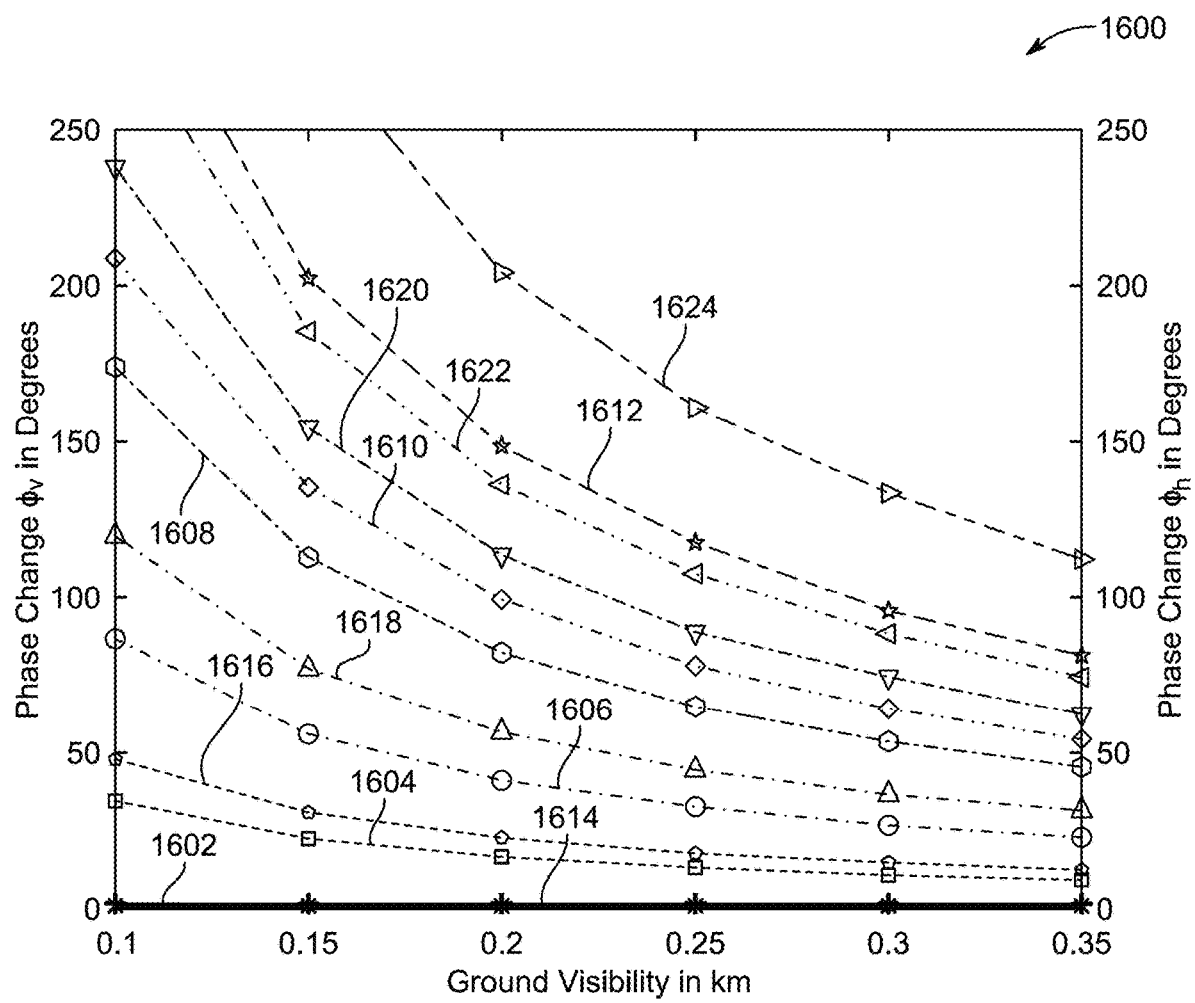
FIG. 16 illustrates the phase shift experienced by both horizontally and vertically polarized waves during their propagation from the UAV unit to the ground as a function of ground visibility for different frequencies at a UAV height of 100 m, in accordance with an exemplary aspect of the disclosure.

FIG. 16 illustrates the phase shift experienced by both horizontally and vertically polarized waves as they propagate from a UAV unit to the ground. The phase shift is analyzed as a function of ground visibility for different frequencies and at a UAV height of 100 meters. A graph 1600 illustrates the variations in phase shift under different atmospheric conditions. The graph 1600 shows separate phase change curves for vertical polarization and horizontal polarization, denoted respectively as $\phi_v$ and $\phi_h$.

Curve 1602 represents the phase shift associated with a frequency of 1 GHz. Curve 1604 represents the phase shift for a frequency of 20 GHz. Curve 1606 represents the phase shift for a frequency of 50 GHz. Curve 1608 represents the phase shift for a frequency of 161 GHz. Curve 1610 represents the phase shift for a frequency of 120 GHz. Curve 1612 represents the phase shift for a frequency of 180 GHz. Curve 1614 represents the phase shift for a frequency of 1 GHz. Curve 1616 represents the phase shift for a frequency of 20 GHz. Curve 1618 represents the phase shift for a frequency of 161 GHz. Curve 1620 represents the phase shift for a frequency of 161 GHz. Curve 1622 represents the phase shift for a frequency of 120 GHz. Curve 1624 represents the phase shift for a frequency of 180 GHz.

As observed, the phase shift of both horizontal and vertical polarization decreases as ground visibility increases. This relationship is more pronounced at higher frequencies, where the UAV signal undergoes stronger dust-induced scattering effects. The reduction in phase shift with increasing ground visibility indicates that the impact of dust particles on the wave propagation diminishes as visibility improves.

Figure 17:
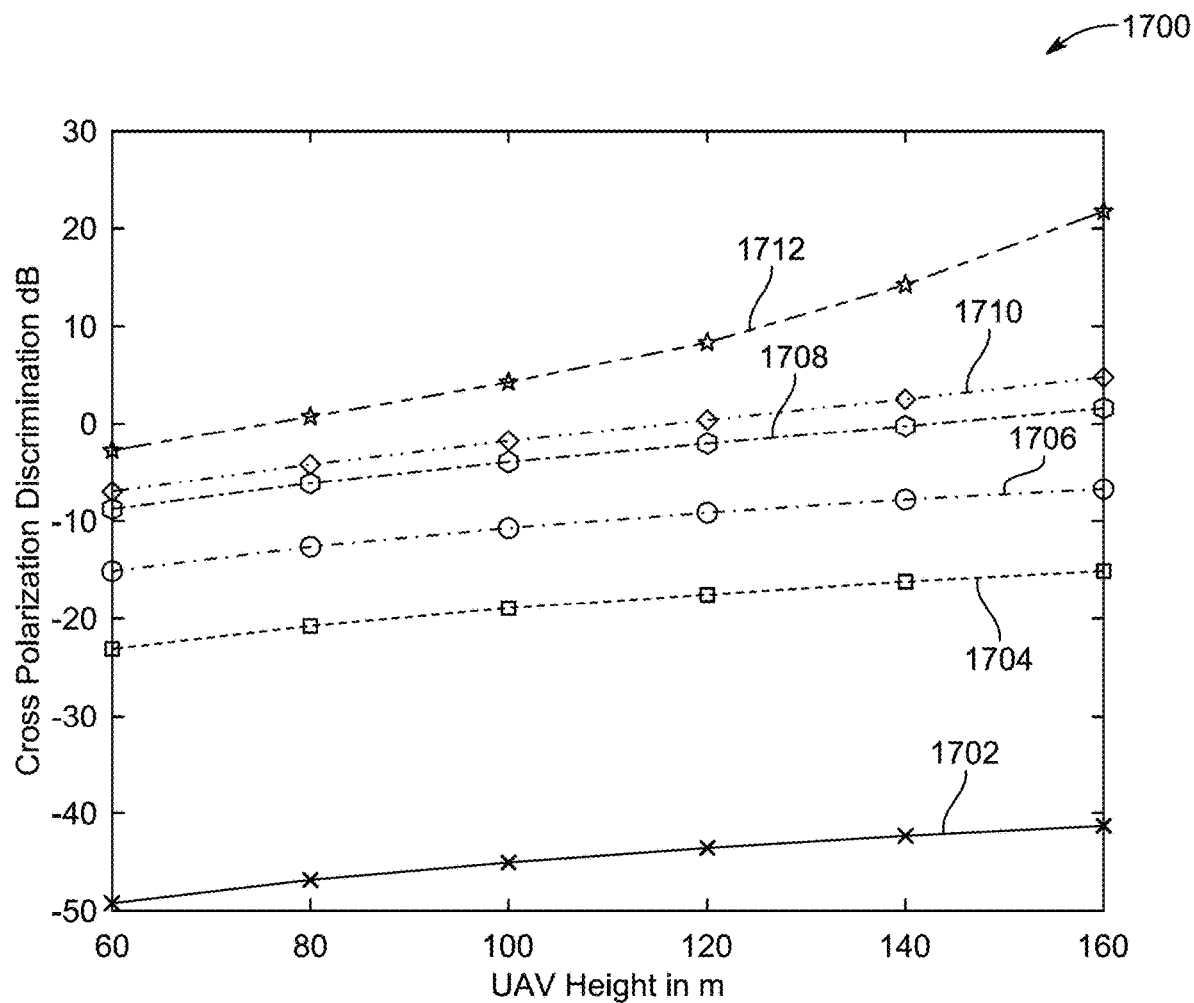
FIG. 17 illustrates the cross-polarization discrimination (XPD) as a function of UAV height for different frequency values at a ground visibility of 100 m, in accordance with an exemplary aspect of the disclosure.

FIG. 17 illustrates the variation of cross-polarization discrimination as a function of UAV height for different frequency values at a ground visibility of 100 meters. A graph 1700 illustrates the extent of polarization purity maintained during the propagation of electromagnetic waves through a dust-laden environment. Higher values of cross-polarization discrimination indicate minimal polarization distortion, while lower values indicate significant depolarization effects. The graph 1700 shows separate phase change curves for vertical polarization and horizontal polarization, denoted respectively as $\phi_v$ and $\phi_h$.

Curve 1702 represents the cross-polarization discrimination for a frequency of 1 GHz. Curve 1704 represents the cross-polarization discrimination for a frequency of 20 GHz. Curve 1706 represents the cross-polarization discrimination for a frequency of 50 GHz. Curve 1708 represents the cross-polarization discrimination for a frequency of 171 GHz. Curve 1710 represents the cross-polarization discrimination for a frequency of 120 GHz. Curve 1712 represents the cross-polarization discrimination for a frequency of 180 GHz.

As observed, the cross-polarization discrimination increases with an increase in UAV height for most frequencies. At lower frequencies, such as 1 GHz, the cross-polarization discrimination remains negative across all UAV heights, indicating significant depolarization effects. At higher frequencies, such as 180 GHz, the cross-polarization discrimination exhibits a positive trend, indicating reduced depolarization and improved polarization retention. This behavior can be attributed to the wavelength-dependent interaction of electromagnetic waves with dust particles, where higher frequencies experience reduced scattering-induced depolarization.

The analysis of cross-polarization discrimination as a function of UAV height allows for the optimization of polarization-based communication strategies in UAV-assisted systems. By selecting appropriate operating frequencies and UAV altitudes, signal integrity can be preserved while mitigating the adverse effects of anisotropic dust propagation.

Figure 18A:
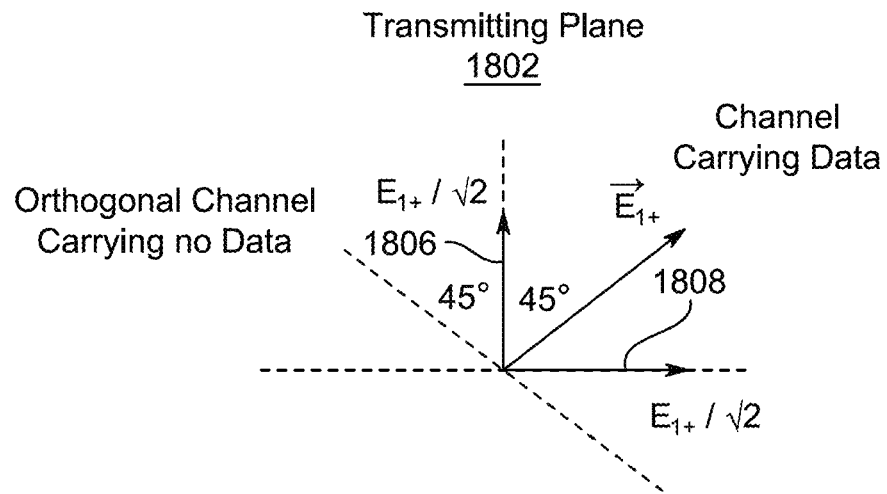
FIG. 18A illustrates the transmission plane of the UAV, showing the orthogonal polarization components and their decomposition into the two primary polarization channels, in accordance with an exemplary aspect of the disclosure.
Figure 18B:
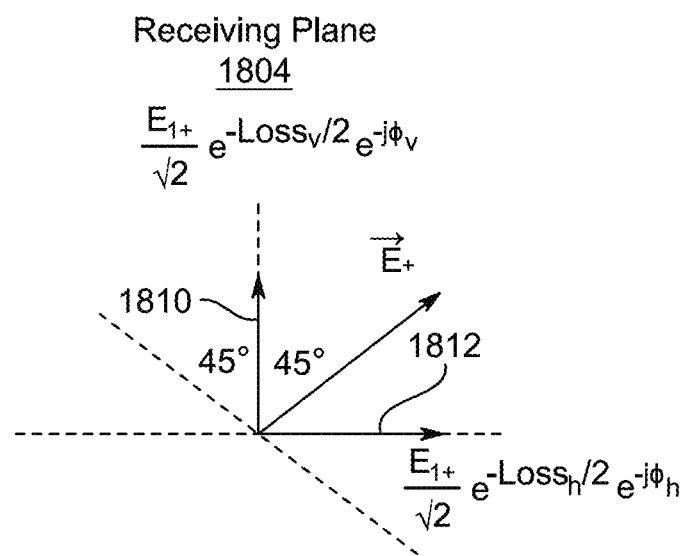
FIG. 18B illustrates the receiving plane of the UAV, showing the impact of propagation on the polarization components and the resulting crosstalk effects, in accordance with an exemplary aspect of the disclosure.

FIG. 18A and FIG. 18B illustrate the crosstalk phenomenon occurring in an anisotropic propagation medium affecting an orthogonally polarized MIMO system. The illustration includes two planes, namely the transmitting plane 1802 and the receiving plane 1804, where the signal undergoes polarization distortion due to differential attenuation and phase shift induced by the propagation medium.

In FIG. 18A, the transmitting plane 1802 represents the orthogonally polarized signals emitted from the transmitting antenna. The transmitted electric field E1+ is composed of two orthogonal components, with the first polarization E1+/$\sqrt{2}$ along a first axis 1806 and the second polarization E1+/$\sqrt{2}$ along the orthogonal axis 1808. The channel carrying data is aligned along the 45° orientation, whereas the orthogonal channel, which ideally carries no data, is oriented at −45° relative to the reference axis.

In FIG. 18B, the receiving plane 1804 illustrates the transformed signal after propagating through the anisotropic medium. Due to the dust-induced attenuation and phase shifts, the received field components are modified. The vertical polarization component $$\frac{E_{1+}}{\sqrt{2}} e^{-Loss_v/2} e^{-j\phi_v}$$

on axis 1810 undergoes a loss factor Lossv and phase shift φv, while the horizontal component $$\frac{E_{1+}}{\sqrt{2}} e^{-Loss_h/2} e^{-j\phi_h}$$

on axis 1812 experiences a different loss factor Loss and phase shift φh. The overall effect results in partial transfer of power from one polarization to another, leading to crosstalk.

The crosstalk phenomenon occurs due to the interaction of electromagnetic waves with anisotropic dust particles, which cause differential phase shifts in the orthogonal components of the transmitted wave. By analyzing this crosstalk, the system can compensate for the differential losses and phase shifts through an adaptive equalization circuit. Such compensation mechanism is a fundamental aspect of the dual-polarized MIMO equalizer antenna system, allowing stable and reliable communication even in dusty environments. The compensation mechanism is realised through mathematical equations as given below.

In first implementation as depicted by FIG. 18A and FIG. 18B, Channel 1, with an electric field polarized at +45° from the vertical axis, transmits the data, while Channel 2, with an electric field polarized at −45° from the vertical axis, does not transmit the data. To calculate the received field component on channel 2, the horizontal and vertical components are projected in the direction of polarization of the idle channel yielding, $$\frac{E_{1+}}{2} e^{-\frac{Loss_v}{2}} e^{-j\Phi_v} - \frac{E_{1+}}{2} e^{-\frac{Loss_h}{2}} e^{-j\Phi_h} = \tag{A1}$$

$$\frac{E_{1+}}{2}\left(e^{-\frac{Loss_v}{2}} e^{-j\Phi_v} - e^{-\frac{Loss_h}{2}} e^{-j\Phi_h}\right) = R\frac{E_{1+}}{2}$$

While the field components received by channel 1 are, $$\frac{E_{1+}}{2} e^{-\frac{Loss_v}{2}} e^{-j\Phi_v} + \frac{E_{1+}}{2} e^{-\frac{Loss_h}{2}} e^{-j\Phi_h} = \tag{A2}$$

$$\frac{E_{1+}}{2}\left(e^{-\frac{Loss_v}{2}} e^{-j\Phi_v} + e^{-\frac{Loss_h}{2}} e^{-j\Phi_h}\right) = T\frac{E_{1+}}{2}$$

Figure 19A:
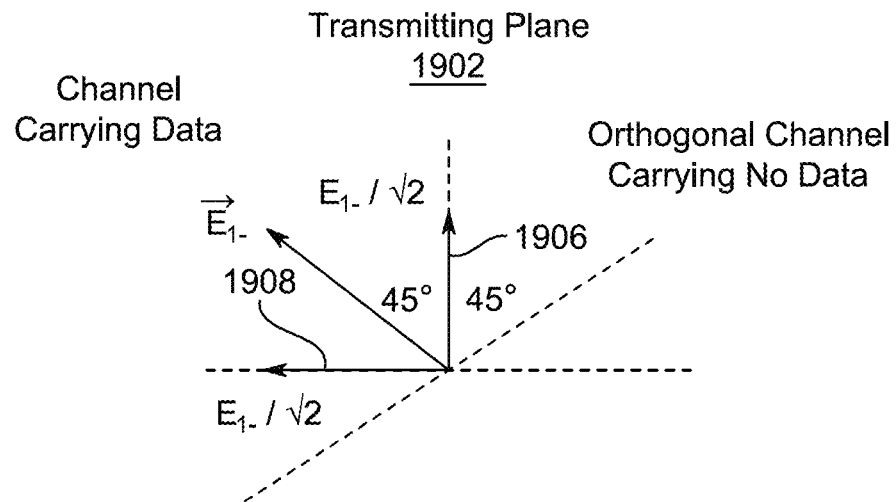
FIG. 19A illustrates the crosstalk effect from the E1− channel to the E1+ channel due to propagation in an anisotropic medium, in accordance with an exemplary aspect of the disclosure.

FIG. 19A illustrates the transmitting plane 1902, showing the decomposition of a transmitted wave into orthogonal components.

In the transmitting plane 1902, the transmitted wave E1− separated into two orthogonal components, each carrying a portion of the total transmitted signal. The first component $E_{1-}/\sqrt{2}$ propagates along a primary channel that carries data, while the second component $E_{1-}/\sqrt{2}$ propagates along an orthogonal channel that carries no data. The resultant electric field vector is oriented at an angle of 45 degrees relative to the reference axis.

The orthogonal channel, which ideally should not carry any data, is susceptible to unintended polarization effects due to propagation in an anisotropic medium. As a result, the transmitted signal in the primary data channel is vulnerable to crosstalk, which may lead to signal leakage between polarization components. The transmission characteristics of the wave serve as a reference for analyzing how the signal is affected during propagation through the anisotropic medium, as depicted in FIG. 19B.

Figure 19B:
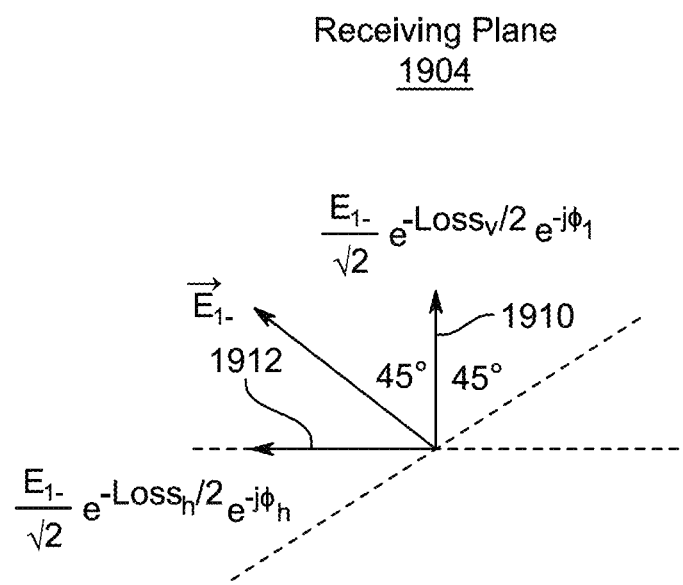
FIG. 19B illustrates the crosstalk effect from the E1+ channel to the E1− channel due to propagation in an anisotropic medium, in accordance with an exemplary aspect of the disclosure.

FIG. 19B illustrates the receiving plane 1904, depicting the effect of propagation through an anisotropic medium on the transmitted signal. In the receiving plane 1904, the wave components undergo attenuation and phase shifts as they travel through the anisotropic dusty environment. The received electric field vector which initially followed the primary data-carrying channel, experiences attenuation and phase distortion caused by the propagation medium.

The receiving plane 1804 illustrates the transformed signal after propagating through the anisotropic medium. Due to the dust-induced attenuation and phase shifts, the received field components are modified. The vertical polarization component $$\frac{E_{1-}}{\sqrt{2}} e^{-Loss_v/2} e^{-j\phi_v}$$

on axis 1810 undergoes a loss factor Lossv and phase shift φv, while the horizontal component $$\frac{E_{1-}}{\sqrt{2}} e^{-Loss_h/2} e^{-j\phi_h}$$

on axis 1812 experiences a different loss factor Lossh and phase shift φh. The overall effect results in partial transfer of power from one polarization to another, leading to crosstalk.

Such crosstalk is particularly problematic in millimeter-wave and terahertz-band communications, where maintaining high polarization purity is essential for achieving efficient signal transmission. Therefore, implementing equalization techniques to dynamically compensate for attenuation-induced losses and phase distortions is required, so that accurate reconstruction of the received signal and minimizing inter-channel interference is achieved.

In contrast to the first implementation described through FIG. 18A and FIG. 18B, a second implementation is illustrated through FIG. 19A and FIG. 19B when Channel 1, with an electric field polarized at +45° from the vertical axis, does not transmit any data, while Channel 2, with an electric field polarized at −45° from the vertical axis, is actively transmitting data.

To determine the received field component on Channel 1, the horizontal and vertical components are projected onto the polarization direction of the inactive channel, resulting in the required calculations as given below:

$$\frac{E_{1-}}{2}e^{-\frac{Loss_v}{2}}e^{-j\Phi_v} - \frac{E_{1-}}{2}e^{-\frac{Loss_h}{2}}e^{-j\Phi_h} = \quad (A3)$$
$$\frac{E_{1-}}{2}\left(e^{-\frac{Loss_v}{2}}e^{-j\Phi_v} - e^{-\frac{Loss_h}{2}}e^{-j\Phi_h}\right) = R\frac{E_{1-}}{2}$$

Where the received signal on active channel 2 (by projecting on its polarization) will be, $$\frac{E_{1-}}{2}e^{-\frac{Loss_v}{2}}e^{-j\Phi_v} + \frac{E_{1-}}{2}e^{-\frac{Loss_h}{2}}e^{-j\Phi_h} = \quad (A4)$$
$$\frac{E_{1-}}{2}\left(e^{-\frac{Loss_v}{2}}e^{-j\Phi_v} + e^{-\frac{Loss_h}{2}}e^{-j\Phi_h}\right) = T\frac{E_{1-}}{2}$$

Here, "T" and "R" are given by, $$T = e^{-\frac{Loss_v}{2}}e^{-j\Phi_v} + e^{-\frac{Loss_h}{2}}e^{-j\Phi_h} \quad (A5)$$
$$R = e^{-\frac{Loss_v}{2}}e^{-j\Phi_v} - e^{-\frac{Loss_h}{2}}e^{-j\Phi_h}$$

Equations A1-A4 can be represented in a matrix form such as, $$\begin{bmatrix} E'_{1+} \\ E'_{1-} \end{bmatrix} = \begin{bmatrix} T & R \\ R & T \end{bmatrix}\begin{bmatrix} E_{1+} \\ E_{1-} \end{bmatrix} \quad (A6)$$

When two channels transmit different data, Cross Polarization Discrimination (XPD) quantifies the extent to which a signal intended for one channel leaks into the other due to imperfect polarization isolation. XPD serves as a measure of unwanted interference by comparing the leaked signal to the intended signal.

For Channel 1, XPD is defined as the ratio of the magnitude of the signal received on Channel 1 but originally transmitted on Channel 2, such as signal leakage from Channel 2, to the magnitude of the main signal received on Channel 1 that was transmitted on Channel 1.

For Channel 2, XPD is similarly defined as the ratio of the magnitude of the signal received on Channel 2 but originally transmitted on Channel 1, such as signal leakage from Channel 1, to the magnitude of the main signal received on Channel 2 that was transmitted on Channel 2.

In both cases, XPD follows the same mathematical formulation, comparing the magnitude of the leaked signal to the intended signal for either channel. The mathematical formulation of XPD is illustrated by Equations 16 and 18.

Various embodiments for an adaptive signal equalizing apparatus for an unmanned aerial vehicle (UAV) operating in a dusty environment have been described in conjunction with FIG. 1A through FIG. 19B.

In an exemplary embodiment, an adaptive signal equalizing apparatus for an unmanned aerial vehicle (UAV) operating in a dusty environment is described. The UAV includes a first multiple-input MIMO antenna channel and a second MIMO antenna channel that are orthogonally polarized. The first and second MIMO antenna channels are configured to transmit data over a carrier frequency from the UAV in sky to a target device on ground. The apparatus comprises a dust level sensor and a signal equalizer device. The dust level sensor is configured to measure a dust level in the dusty environment. The signal equalizer device is configured to, based on the measured dust level, the carrier frequency, a height of the UAV, and an elevation angle from the UAV to the target device, estimate a dust-induced change in a communication link from the UAV to the target device, and based on the estimated dust-induced change, adjust signals fed into the first and second MIMO antenna channels, such that crosstalk induced by the dusty environment between the first and second MIMO antenna channels is eliminated.

In some embodiments, the signal equalizer is configured to estimate the crosstalk induced by the dusty environment between the first and second MIMO antenna channels. Based on this estimation, the signal equalizer applies an initial crosstalk between the first and second MIMO antenna channels to counteract the crosstalk effects caused by the dusty environment.

In some embodiments, the signal equalizer is configured to acquire a first signal to be transmitted from the first MIMO antenna channel and a second signal to be transmitted from the second MIMO antenna channel. The first and second signals are projected onto a vertical plane and a horizontal plane, generating a pair of vertical plane components and a pair of horizontal plane components. The vertical plane is perpendicular to both a first plane and the ground surface, while the horizontal plane is parallel to the ground surface and perpendicular to the first plane. Based on the estimated dust-induced change, the vertical plane components are adjusted, resulting in an adjusted pair of vertical plane components. The adjusted vertical plane components are then combined with the horizontal plane components to produce equalized first and second signals, which are subsequently fed into the first and second MIMO antenna channels.

In some embodiments, the signal equalizer estimates the dust-induced change in the communication link by determining the attenuation level and phase shift caused by the dusty environment for both vertically and horizontally polarized waves propagating from the UAV to the target device.

In some embodiments, the elevation angle from the UAV to the target device is a predefined value.

In some embodiments, the UAV includes a controller that adjusts the elevation angle to a target value, and the signal equalizer acquires the elevation angle from the controller.

In some embodiments, the height of the UAV is obtained from a sensor mounted on the UAV, which measures the altitude of the UAV relative to the ground.

In some embodiments, the data is continuously transmitted from the UAV to the target device, and the signal equalizer dynamically adjusts the signals fed into the first and second MIMO antenna channels in real-time.

In some embodiments, the data is transmitted in discrete packets from the UAV to the target device, and the signal equalizer adjusts the signals fed into the first and second MIMO antenna channels immediately before each packet transmission.

In some embodiments, the dust level sensor measures the concentration of dust particles at the UAV's altitude and uses this as the measured dust level.

In some embodiments, a method for adaptive signal equalization in a UAV operating in a dusty environment is disclosed. The UAV includes a first and second MIMO antenna channel that are orthogonally polarized and configured to transmit data over a carrier frequency to a target device. The method involves measuring the dust level using a dust level sensor and estimating a dust-induced change in the communication link based on the dust level, carrier frequency, UAV height, and elevation angle. Based on this estimation, the method further includes adjusting the signals fed into the MIMO antenna channels to eliminate crosstalk caused by the dusty environment.

In some embodiments, the method further includes estimating the crosstalk induced by the dusty environment between the first and second MIMO antenna channels. To mitigate this effect, the method applies an initial crosstalk between the two channels to cancel out the environmental interference.

In some embodiments, the method further involves acquiring first and second signals for transmission, projecting these signals onto a vertical and horizontal plane, and generating corresponding vertical and horizontal plane components. Based on the estimated dust-induced change, the vertical plane components are adjusted, and the adjusted vertical plane components are combined with the horizontal plane components. The resulting equalized signals are then fed into the respective MIMO antenna channels.

In some embodiments, the method includes estimating an attenuation level and phase shift caused by the dusty environment for both vertically and horizontally polarized waves propagating from the UAV to the target device.

In some embodiments, the elevation angle from the UAV to the target device is a predefined value.

In some embodiments, the UAV includes a controller that adjusts the elevation angle to a target value, and the signal equalizer acquires the elevation angle from the controller.

In some embodiments, the height of the UAV is determined by a sensor mounted on the UAV that measures the UAV's altitude relative to the ground.

In some embodiments, the data is transmitted continuously, and the signal equalizer performs real-time adjustments to the signals fed into the MIMO antenna channels.

In some embodiments, the data is transmitted in discrete packets, and the signal equalizer adjusts the signals immediately before each packet is transmitted.

In some embodiments, the dust level sensor measures the concentration of dust particles at the UAV's altitude and utilizes this as the measured dust level.

Figure 20:
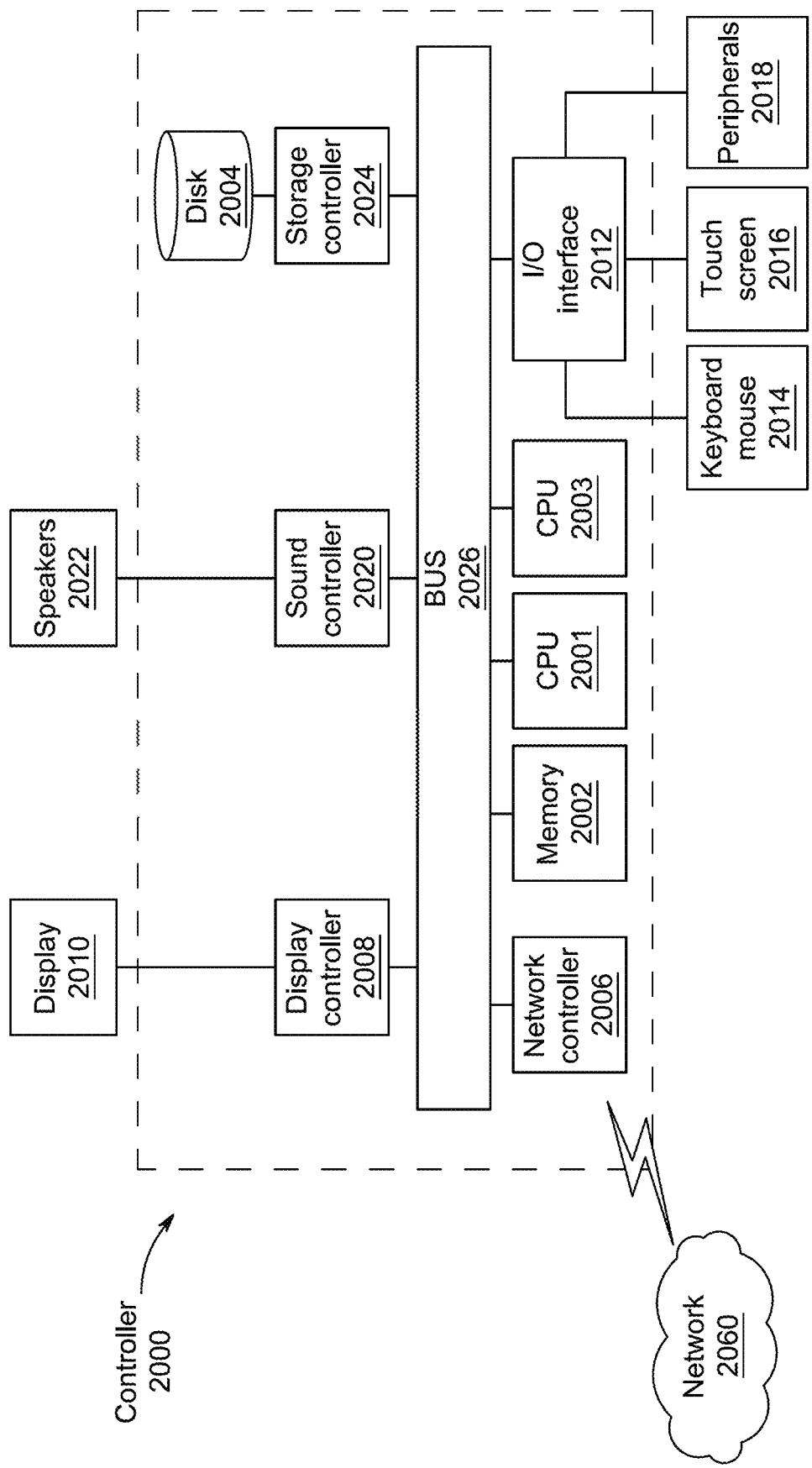
FIG. 20 is an illustration of a non-limiting example of details of computing hardware used in the UAV navigation system, according to certain embodiments.
Figure 21:
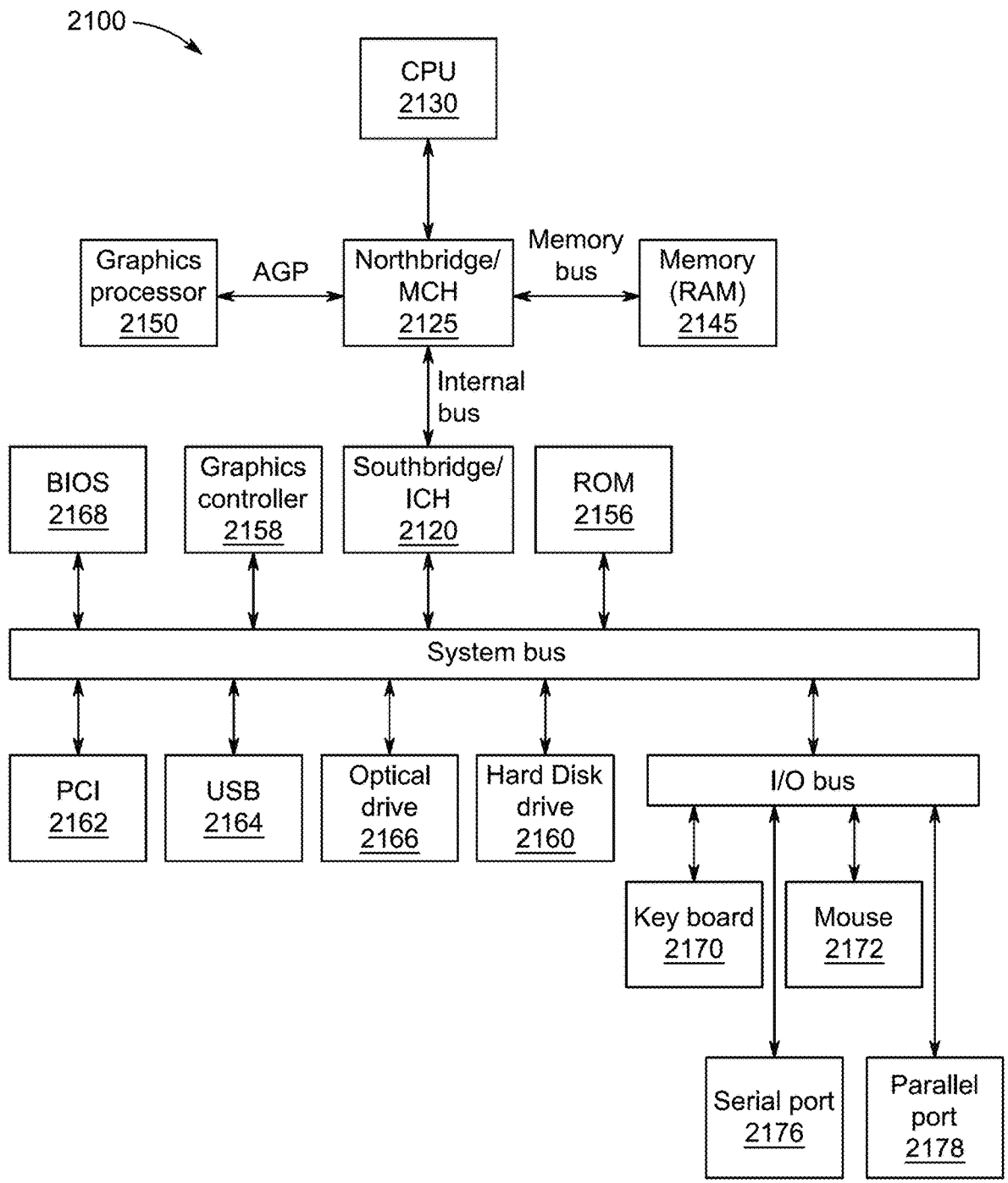
FIG. 21 is an exemplary schematic diagram of a data processing system used within the UAV navigation system, according to certain embodiments.

Next, further details of the hardware description of the computing environment according to exemplary embodiments are described with reference to FIG. 20. In FIG. 20, a controller 2000 is described and is representative of the signal equalizing apparatus 126 of FIG. 1B in which the controller is a computing device that includes a CPU 2001 which performs the processes described above/below. The process data and instructions may be stored in memory 2002. These processes and instructions may also be stored on a storage medium disk 2004 such as a hard drive (HDD) or portable storage medium or may be stored remotely.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk, or any other information processing device with which the computing device communicates, such as a server or computer.

Further, the claims may be provided as a utility application, background daemon, or component of an operating system, or a combination thereof, executing in conjunction with CPU 2001, 2003 and an operating system such as Microsoft Windows 7, Microsoft Windows 10, Microsoft Windows 11, UNIX, Solaris, LINUX, Apple MAC-OS, and other systems known to those skilled in the art.

The hardware elements to achieve the computing device may be realized by various circuitry elements, known to those skilled in the art. For example, CPU 2001 or CPU 2003 may be a Xenon or Core processor from Intel of America or an Opteron processor from AMD of America or may be other processor types that would be recognized by one of ordinary skill in the art. Alternatively, the CPU 2001, 2003 may be implemented on an FPGA, ASIC, PLD, or using discrete logic circuits, as one of ordinary skill in the art would recognize. Further, C P U 2001, 2003 may be implemented as multiple processors cooperatively working in parallel to perform the instructions of the inventive processes described above.

The computing device in FIG. 20 also includes a network controller 2106, such as an Intel Ethernet PRO network interface card from Intel Corporation of America, for interfacing with network 2160. As can be appreciated, the network 2160 can be a public network, such as the Internet, or a private network such as an LAN or WAN network, or any combination thereof, and can also include PSTN or ISDN sub-networks. The network 2160 can also be wired, such as an Ethernet network, or can be wireless such as a cellular network including EDGE, 3G, 4G, and 5G wireless cellular systems. The wireless network can also be WiFi, Bluetooth, or any other wireless form of communication that is known.

The computing device further includes a display controller 2108, such as a NVIDIA GeForce GTX or Quadro graphics adapter from NVIDIA Corporation of America for interfacing with display 2110, such as a Hewlett Packard HPL2445w LCD monitor. A general-purpose I/O interface 2112 interfaces with a keyboard and/or mouse 2114, as well as a touch screen panel 2116 on or separate from display 2110. The general-purpose I/O interface also connects to a variety of peripherals 2118, including printers and scanners, such as an OfficeJet or DeskJet from Hewlett Packard.

A sound controller 2120 is also provided in the computing device, such as Sound Blaster X-Fi Titanium from Creative, to interface with speakers/microphone 2122, thereby providing sounds and/or music.

The general-purpose storage controller 2124 connects the storage medium disk 1304 with communication bus 2126, which may be an ISA, EISA, VESA, PCI, or similar, for interconnecting all of the components of the computing device. A description of the general features and functionality of the display 2110, keyboard and/or mouse 2121, as well as the display controller 2108, storage controller 2124, network controller 2106, sound controller 2120, and general-purpose I/O interface 2112 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown in FIG. 22.

Figure 22:
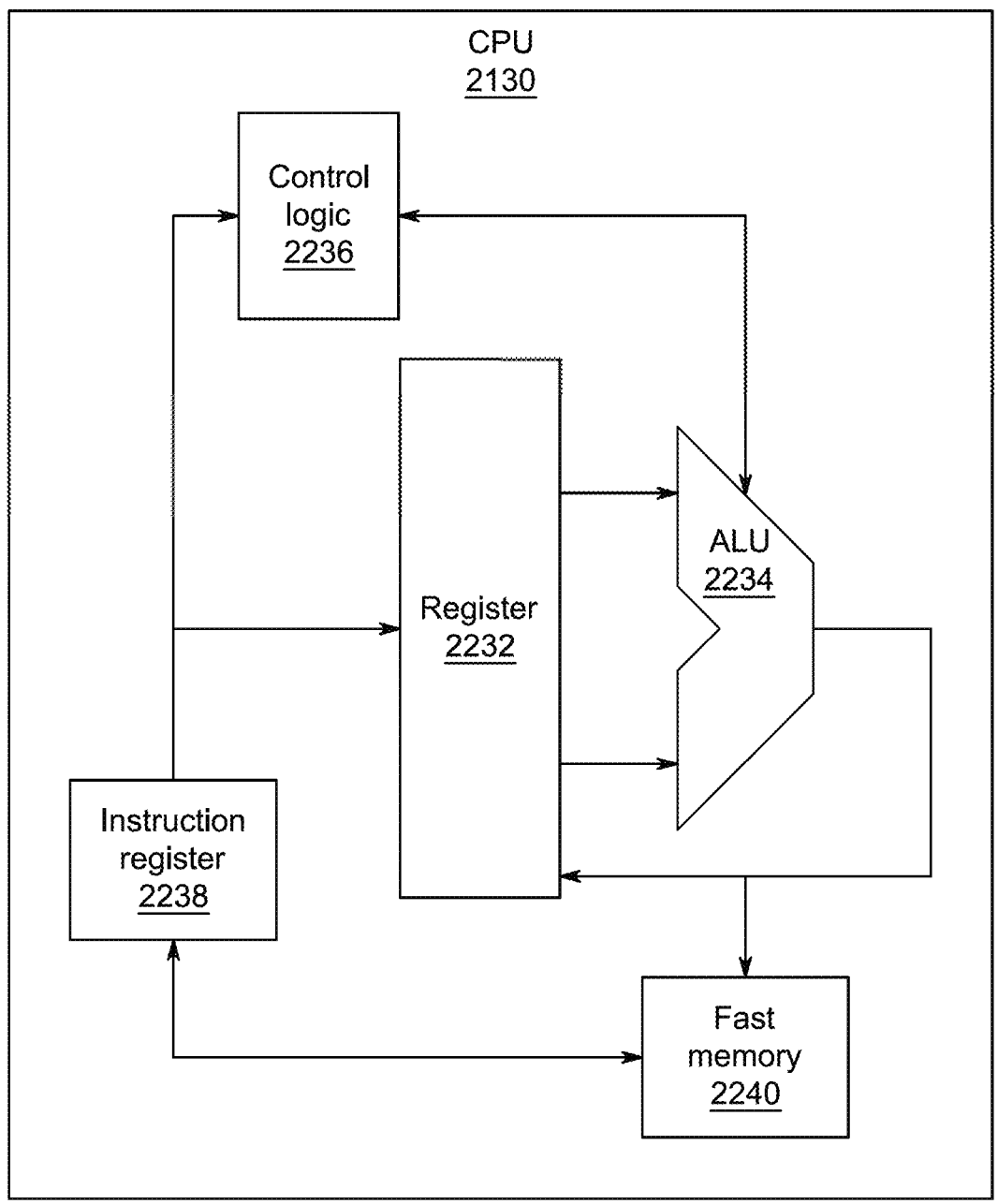
FIG. 22 is an exemplary schematic diagram of a processor used with the UAV navigation system, according to certain embodiments.
Figure 23:
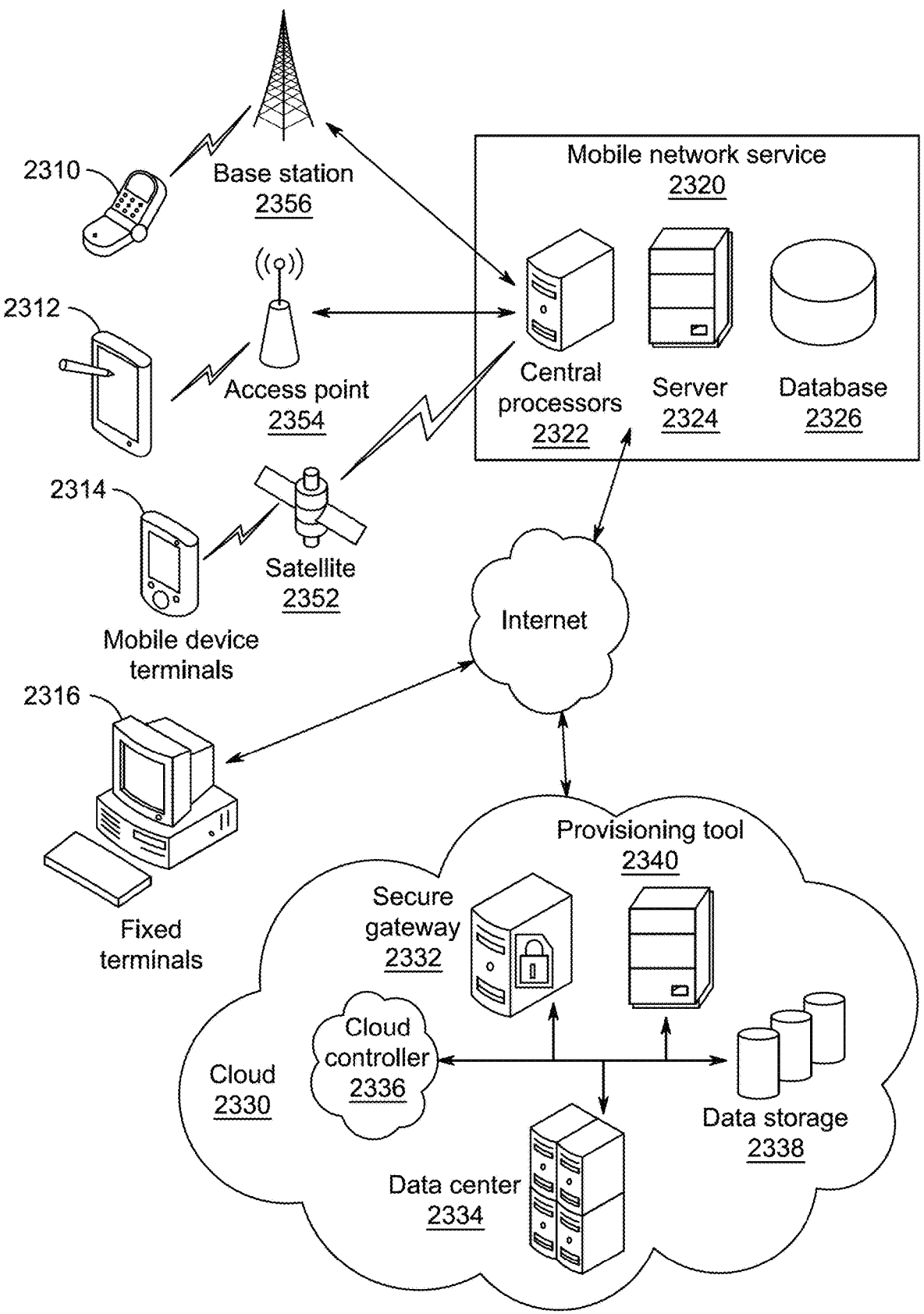
FIG. 23 is an illustration of a non-limiting example of distributed components which may share processing with the controller, according to certain embodiments.

FIG. 22 shows a schematic diagram of a data processing system, according to certain embodiments, for performing the functions of the exemplary embodiments. The data processing system is an example of a computer in which code or instructions implementing the processes of the illustrative embodiments may be located.

In FIG. 22, data processing system 2200 employs a hub architecture including a north bridge and memory controller hub (NB/MCH) 2225 and a south bridge and input/output (I/O) controller hub (SB/ICH) 2220. The central processing unit (CPU) 2230 is connected to NB/MCH 2225. The NB/MCH 2225 also connects to the memory 2245 via a memory bus and connects to the graphics processor 2250 via an accelerated graphics port (AGP). The NB/MCH 2225 also connects to the SB/ICH 2220 via an internal bus (e.g., a unified media interface or a direct media interface). The CPU Processing unit 2230 may contain one or more processors and even may be implemented using one or more heterogeneous processor systems.

For example, FIG. 22 shows one implementation of CPU 2230. In one implementation, the instruction register 2238 retrieves instructions from the fast memory 2240. At least part of these instructions is fetched from the instruction register 2238 by the control logic 2236 and interpreted according to the instruction set architecture of the CPU 2230. Part of the instructions can also be directed to the register 2232. In one implementation, the instructions are decoded according to a hardwired method, and in another implementation, the instructions are decoded according to a microprogram that translates instructions into sets of CPU configuration signals that are applied sequentially over multiple clock pulses. After fetching and decoding the instructions, the instructions are executed using the arithmetic logic unit (ALU) 2234 that loads values from the register 2232 and performs logical and mathematical operations on the loaded values according to the instructions. The results from these operations can be fed back into the register and/or stored in the fast memory 2240. According to certain implementations, the instruction set architecture of the CPU 2230 can use a reduced instruction set architecture, a complex instruction set architecture, a vector processor architecture, a very large instruction word architecture. Furthermore, the CPU 2230 can be based on the Von Neumann model or the Harvard model. The CPU 2230 can be a digital signal processor, an FPGA, an ASIC, a PLA, a PLD, or a CPLD. Further, the CPU 2230 can be an x86 processor by Intel or by AMD; an ARM processor, a Power architecture processor by, e.g., IBM; a SPARC architecture processor by Sun Microsystems or by Oracle; or other known CPU architectures.

Referring again to FIG. 22, the data processing system 2200 can include that the SB/ICH 2220 is coupled through a system bus to an I/O Bus, a read-only memory (ROM) 2256, universal serial bus (USB) port 2264, a flash binary input/output system (BIOS) 2268, and a graphics controller 2258. PCI/PCIe devices can also be coupled to SB/ICH 2288 through a PCI bus 2262.

The PCI devices may include, for example, Ethernet adapters, add-in cards, and PC cards for notebook computers. The Hard disk drive 2260 and CD-ROM 2266 can use, for example, an integrated drive electronics (IDE) or serial advanced technology attachment (SATA) interface. In one implementation, the I/O bus can include a super I/O (SIO) device.

Further, the hard disk drive (HDD) 2260 and optical drive 2266 can also be coupled to the SB/ICH 2220 through a system bus. In one implementation, a keyboard 2270, a mouse 2272, a parallel port 2278, and a serial port 2276 can be connected to the system bus through the I/O bus. Other peripherals and devices that can be connected to the SB/ICH 2220 using a mass storage controller such as SATA or PATA, an Ethernet port, an ISA bus, an LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes in battery sizing and chemistry or based on the requirements of the intended backup load to be powered.

The functions and features described herein may also be executed by various distributed components of a system. For example, one or more processors may execute these system functions, wherein the processors are distributed across multiple components communicating in a network. The distributed components may include one or more client and server machines, such as cloud 2330 including a cloud controller 2336, a secure gateway 2332, a data center 2334, data storage 2338 and a provisioning tool 2340, and mobile network services 2320 including central processors 2322, a server 2324, and a database 2326, which may share processing, as shown in FIG. 1, in addition to various human interface and communication devices (e.g., display monitors 2316, smartphones 2310, tablets 2323, personal digital assistants (PDAs) 2314). The network may be a private network, such as an LAN, satellite 2352, or WAN 2354, or be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

The above-described hardware description is a non-limiting example of corresponding structure for performing the functionality described herein.

Numerous modifications and variations of the present disclosure are possible in light of the above teachings. It is therefore to be understood that the invention may be practiced otherwise than as specifically described herein.

The invention claimed is:

1. An adaptive signal equalizing apparatus for an unmanned aerial vehicle (UAV) operating in a dusty environment, the UAV having a first multiple-input multiple-output (MIMO) antenna channel and a second MIMO antenna channel that are orthogonally polarized, the first and second MIMO antenna channels being configured to transmit data over a carrier frequency from the UAV in sky to a target device on ground, the apparatus comprising:
   a dust level sensor; and
   a signal equalizer device, wherein
   the dust level sensor is configured to measure a dust level in the dusty environment, and
   the signal equalizer device is configured to:
   based on the measured dust level, the carrier frequency, a height of the UAV, and an elevation angle from the UAV to the target device, estimate a dust-induced change in a communication link from the UAV to the target device, and
   based on the estimated dust-induced change, adjust signals fed into the first and second MIMO antenna channels, such that crosstalk induced by the dusty environment between the first and second MIMO antenna channels is eliminated.

2. The apparatus of claim 1, wherein the signal equalizer device is further configured to:
- estimate the crosstalk induced by dusty environment between the first and second MIMO antenna channels, and
- apply an initial crosstalk between the first and second MIMO antenna channels, so as to cancel out the crosstalk induced by the dusty environment.

3. The apparatus of claim 2, wherein the signal equalizer is further configured to:
- acquire a first signal ($\vec{E}_+$) to be transmitted from the first MIMO antenna channel and a second signal ($\vec{E}_-$) to be transmitted from the second MIMO antenna channel,
- project the first and second signals ($\vec{E}_+$; $\vec{E}_-$) to a vertical plane and a horizontal plane, to generate a pair of vertical plane components ($\vec{E}_{1+}$; $\vec{E}_{1-}$) in the vertical plane and a pair of horizontal plane components ($\vec{E}_{2+}$; $\vec{E}_{2-}$) in the horizontal plane, wherein the vertical plane is perpendicular to both a first plane and a ground surface, the horizontal plane is parallel to the ground surface and perpendicular to the first plane, and the first plane contains a line-of-sight from the UAV to the target device and is perpendicular to the ground surface,
- based on the estimated dust-induced change, adjust the pair of vertical plane components ($\vec{E}_{1+}$; $\vec{E}_{1-}$) to obtain an adjusted pair of vertical plane components ($\vec{E}_{+eq}$; $\vec{E}_{-eq}$),
- combine the adjusted pair of vertical plane components ($\vec{E}_{+eq}$; $\vec{E}_{-eq}$) and the pair of horizontal plane components ($\vec{E}_{2+}$; $\vec{E}_{2-}$) to obtain an equalized first signal and an equalized second signal, and
- feed the equalized first and second signals into the first and second MIMO antenna channels, respectively.

4. The apparatus of claim 1, wherein the signal equalizer is further configured to estimate, as the estimated dust-induced change:
- an attenuation level caused by the dusty environment to a vertically polarized wave propagating from the UAV to the target device,
- a phase shift caused by the dusty environment to the vertically polarized wave propagating from the UAV to the target device,
- an attenuation level caused by the dusty environment to a horizontally polarized wave propagating from the UAV to the target device, and
- a phase shift caused by the dusty environment to the horizontally polarized wave propagating from the UAV to the target device.

5. The apparatus of claim 1, wherein the elevation angle from the UAV to the target device is a predefined value.

6. The apparatus of claim 1, wherein the UAV further comprises a controller for adjusting the elevation angle to a target value, and the signal equalizer device is further configured to acquire the elevation angle from the controller.

7. The apparatus of claim 1, wherein the height of the UAV is acquired from a sensor equipped at the UAV for measuring the height of the UAV above the ground.

8. The apparatus of claim 1, wherein the data is transmitted continuously from the UAV to the target device, and the signal equalizer device adjusts the signals fed into the first and second MIMO antenna channels in a real-time manner.

9. The apparatus of claim 1, wherein the data is transmitted in a plurality of packets from the UAV to the target device, and the signal equalizer device adjusts the signals fed into the first and second MIMO antenna channels immediately before each of the plurality of packets is transmitted.

10. The apparatus of claim 1, wherein the dust level sensor measures a concentration of dust particles at the height of the UAV, as the measured dust level.

11. An adaptive signal equalizing method for an unmanned aerial vehicle (UAV) operating in a dusty environment, the UAV having a first multiple-input multiple-output (MIMO) antenna channel and a second MIMO antenna channel that are orthogonally polarized, the first and second MIMO antenna channels being configured to transmit data over a carrier frequency from the UAV in sky to a target device on ground, the method comprising:
- via a dust level sensor, measuring a dust level in the dusty environment; and
- via a signal equalizer device,
- based on the measured dust level, the carrier frequency, a height of the UAV, and an elevation angle from the UAV to the target device, estimating a dust-induced change in a communication link from the UAV to the target device, and
- based on the estimated dust-induced change, adjusting signals fed into the first and second MIMO antenna channels, such that crosstalk induced by the dusty environment between the first and second MIMO antenna channels is eliminated.

12. The method of claim 11, further comprising, via the signal equalizer:
- estimating the crosstalk induced by dusty environment between the first and second MIMO antenna channels, and
- applying an initial crosstalk between the first and second MIMO antenna channels, so as to cancel out the crosstalk induced by the dusty environment.

13. The method of claim 12, further comprising, via the signal equalizer:
- acquiring a first signal ($\vec{E}_+$) to be transmitted from the first MIMO antenna channel and a second signal ($\vec{E}_-$) to be transmitted from the second MIMO antenna channel,
- projecting the first and second signals ($\vec{E}_+$; $\vec{E}_-$) to a vertical plane and a horizontal plane, to generate a pair of vertical plane components ($\vec{E}_{1+}$; $\vec{E}_{1-}$) in the vertical plane and a pair of horizontal plane components ($\vec{E}_{2+}$; $\vec{E}_{2-}$) in the horizontal plane, wherein the vertical plane is perpendicular to both a first plane and a ground surface, the horizontal plane is parallel to the ground surface and perpendicular to the first plane, and the first plane contains a line-of-sight from the UAV to the target device and is perpendicular to the ground surface,
- based on the estimated dust-induced change, adjusting the pair of vertical plane components ($\vec{E}_{1+}$; $\vec{E}_{1-}$) to obtain an adjusted pair of vertical plane components ($\vec{E}_{+eq}$; $\vec{E}_{-eq}$),
- combining the adjusted pair of vertical plane components ($\vec{E}_{+eq}$; $\vec{E}_{-eq}$) and the pair of horizontal plane components ($\vec{E}_{2+}$; $\vec{E}_{2-}$) to obtain an equalized first signal and an equalized second signal, and feeding the equalized first and second signals into the first and second MIMO antenna channels, respectively.

14. The method of claim 11, further comprising, via the signal equalizer, estimating:
an attenuation level caused by the dusty environment to a vertically polarized wave propagating from the UAV to the target device,
a phase shift caused by the dusty environment to the vertically polarized wave propagating from the UAV to the target device,
an attenuation level caused by the dusty environment to a horizontally polarized wave propagating from the UAV to the target device, and
a phase shift caused by the dusty environment to the horizontally polarized wave propagating from the UAV to the target device,
as the estimated dust-induced change.

15. The method of claim 11, wherein the elevation angle from the UAV to the target device is a predefined value.

16. The method of claim 11, wherein the UAV further comprises a controller for adjusting the elevation angle to a target value, and the signal equalizer device acquires the elevation angle from the controller.

17. The method of claim 11, wherein the height of the UAV is acquired from a sensor equipped at the UAV for measuring the height of the UAV above the ground.

18. The method of claim 11, wherein the data is transmitted continuously from the UAV to the target device, and the signal equalizer device adjusts the signals fed into the first and second MIMO antenna channels in a real-time manner.

19. The method of claim 11, wherein the data is transmitted in a plurality of packets from the UAV to the target device, and the signal equalizer device adjusts the signals fed into the first and second MIMO antenna channels immediately before each of the plurality of packets is transmitted.

20. The method of claim 11, wherein the dust level sensor measures a concentration of dust particles at the height of the UAV, as the measured dust level.

* * * * *